(12) United States Patent
Katz

(10) Patent No.: US 7,019,770 B1
(45) Date of Patent: Mar. 28, 2006

(54) VIDEOPHONE SYSTEM FOR SCRUTINY MONITORING WITH COMPUTER CONTROL

(75) Inventor: Ronald A. Katz, Los Angeles, CA (US)

(73) Assignee: Telebuyer, LLC, Los Angeles, CA (US)

( * ) Notice: Subject to any disclaimer, the term of this patent is extended or adjusted under 35 U.S.C. 154(b) by 0 days.

(21) Appl. No.: 08/407,064

(22) Filed: Mar. 20, 1995

Related U.S. Application Data

(63) Continuation of application No. 08/067,783, filed on May 25, 1993, now abandoned, which is a continuation-in-part of application No. 08/031,235, filed on Mar. 12, 1993, now Pat. No. 5,412,708.

(51) Int. Cl.
*H04M 11/00* (2006.01)

(52) U.S. Cl. ............... 348/14.01; 379/37; 379/39; 379/40; 379/45; 348/143; 348/153

(58) Field of Classification Search .......... 348/14, 348/15, 16, 13, 143, 150–161; 379/102, 379/104, 105, 92, 96, 93, 94, 142, 202, 203, 379/204, 205, 38, 40, 39, 42, 43, 44, 45, 379/49, 88, 102.01, 102.02, 102.07
See application file for complete search history.

(56) References Cited

U.S. PATENT DOCUMENTS

| | | | |
|---|---|---|---|
| 3,881,060 A | | 4/1975 | Connell et al. |
| 4,037,250 A | * | 7/1977 | McGahan et al. ........ 348/159 |
| 4,137,429 A | * | 1/1979 | Stockdale ................ 379/42 |
| 4,141,006 A | * | 2/1979 | Braxton ................... 379/42 |
| 4,360,827 A | | 11/1982 | Braun |
| 4,450,477 A | | 5/1984 | Lovett |

(Continued)

FOREIGN PATENT DOCUMENTS

EP 188286 7/1986

(Continued)

OTHER PUBLICATIONS

"Vision By Telephone", Peter Wright, Computer Systems, pp. 55-58, Jan. 1986.*

(Continued)

*Primary Examiner*—Stella Woo
(74) *Attorney, Agent, or Firm*—Berry & Associates P.C.

(57) ABSTRACT

In conjunction with the dial-up public telephone system, voice quality lines carry videophone signals for monitoring a multitude of locations from at least one central station for use in a variety of applications, such as for security, surveillance, quality control and inspection, regulation of food and/or other standards in food-related and other facilities, market research, remote monitoring of deposit and withdrawal of funds at bank vaults, grocery chains, convenience stores, and the like. At the central station, telephonic interface apparatus is actuated by a control unit to selectively accomplish a telephonic connection with a remote location. Displays include the scene at the remote location and related graphic data. During routine operation, remote locations are displayed in sequence to at least one operator. Such operation may be interrupted either from a remote location or central station in the event of an urgency. In such an event, the concerned scrutiny location is displayed for further communication involving status, camera selection, camera configuration, audio, video and so on. Incoming calls from scrutiny stations imply an urgent situation for immediate display. The called number, by dialed number identification system (DNIS) may indicate the status while the calling number identifies the location by automatic number identification (ANI) signals. Alternative signalling and code techniques afford flexible operation as with respect to various graphic and status indications available for displays.

84 Claims, 10 Drawing Sheets

U.S. PATENT DOCUMENTS

| | | | |
|---|---|---|---|
| 4,493,948 A | | 1/1985 | Sues et al. |
| 4,635,251 A | | 1/1987 | Stanley et al. |
| 4,641,127 A | | 2/1987 | Hogan et al. |
| 4,704,725 A | | 11/1987 | Harvey et al. |
| 4,805,134 A | | 2/1989 | Calo et al. |
| 4,825,457 A | | 4/1989 | Lebowitz |
| 4,843,377 A | * | 6/1989 | Fuller et al. ............... 379/49 |
| 4,873,662 A | | 10/1989 | Sargent |
| 4,876,597 A | | 10/1989 | Roy et al. |
| 4,893,325 A | | 1/1990 | Pankonen et al. |
| 4,907,160 A | * | 3/1990 | Duncan et al. ........ 379/106.01 |
| 4,916,435 A | | 4/1990 | Fuller |
| 4,922,520 A | * | 5/1990 | Bernard et al. .......... 379/92.03 |
| 4,939,773 A | | 7/1990 | Katz |
| 4,954,886 A | | 9/1990 | Elberbaum |
| 4,955,052 A | * | 9/1990 | Hussain ............... 379/106.01 |
| 4,962,473 A | | 10/1990 | Crain |
| 5,109,399 A | * | 4/1992 | Thompson ................ 379/45 |
| 5,109,414 A | | 4/1992 | Harvey et al. |
| 5,164,982 A | | 11/1992 | Davis |
| 5,170,427 A | * | 12/1992 | Guichard et al. ............. 348/14 |
| 5,202,759 A | * | 4/1993 | Laycock .................. 348/14 |
| 5,229,850 A | * | 7/1993 | Toyoshima ............... 348/153 |
| 5,233,654 A | | 8/1993 | Harvey et al. |
| 5,264,929 A | * | 11/1993 | Yamaguchi ............... 348/159 |
| 5,289,275 A | * | 2/1994 | Ishii et al. ................. 348/159 |
| 5,335,277 A | | 8/1994 | Harvey et al. |
| 5,412,708 A | * | 5/1995 | Katz ...................... 348/14 |
| 5,455,903 A | | 10/1995 | Jolissaint et al. |
| 5,689,553 A | | 11/1997 | Ahuja et al. |
| 5,870,724 A | | 2/1999 | Lawlor et al. |

FOREIGN PATENT DOCUMENTS

| | | |
|---|---|---|
| JP | 63-260536 | 4/1990 |
| JP | 0029456 | 2/1991 |

OTHER PUBLICATIONS

Angiolillo, J., et al., "Personal Visual Communications Enters The Market Place," *Visual Communications, AT&T Technology Products, Systems and Services*, vol. 7, No. 3, fall 1992, pp. 18-28—(Article).

Cerbone, R., "The Corning HDTV Wave," *Visual Communications, AT&T Technology Products, Systems and Services*, vol. 7, No. 3, fall 1992, pp. 14-17—(Article).

Rangan, P. Vankat. "Video conferencing, file storage, and management in multimedia computer systems", *Computer Networks and ISDN Systems*, Mar. 1993, vol. 25, No. 8, pp. 901-919 (Article).

Imai, R., et al., "Multimedia Communication Technology", *Fujitsu Scientific & Technical Journal*, 1992, vol. 28, No. 2, pp. 172-179- (Article).

Yager, T., "Better Than Being There", *Byte*, Mar. 1993, vol. 18, pp. 129-130, 132-134- (Article).

Wright, Peter, "Vision by Telephone" *Computer Systems*, Jan. 1986 Bramley. (Great Britain)- (Article).

* cited by examiner

VIDEOPHONE SYSTEM FOR SCRUTINY MONITORING WITH COMPUTER CONTROL

CROSS REFERENCE TO RELATED APPLICATIONS

This application is a continuation application of application Ser. No. 08/067,783, entitled "VIDEOPHONE SYSTEM FOR SC INY MONITORING WITH COMPUTER CONTROL," filed on May 25, 1993, now abandoned which is a continuation-in-part application of application Ser. No. 08/031,235, entitled "VIDEOPHONE SYSTEM FOR SCRUTINY MONITORING WITH COMPUTER CONTROL," filed on Mar. 12, 1993, now U.S. Pat. No. 5,412,708.

FIELD OF THE INVENTION

The present invention relates generally to scrutiny systems and more particularly to a videophone system for monitoring remote locations from a central unit for use in a variety of applications, such as for security, surveillance, quality control and inspection, regulation of food and/or other standards in food-related and other facilities, market research, remote monitoring of deposit and withdrawal of funds at bank vaults, grocery chains, convenience stores, and the like.

BACKGROUND OF THE INVENTION

Over the years, a multitude of security and surveillance systems have been proposed for monitoring various locations for different reasons. For example, it is particularly desirable to monitor locations involving some exposure to risk or peril. Generally, the objectives have included discouraging an intruder, notifying security personnel, as police, and providing some form of record of any criminal or culpable activity.

Various forms of photographic devices have been proposed for use in security systems; however, the advent of television substantially enhanced the possibilities for scrutiny or surveillance of a location. In that regard, large modern office buildings are seldom without an internal closed-circuit system with a guard station displaying several significant locations within the building. Accordingly, a single guard can monitor a sizeable building, summoning help to a problem location. Furthermore, it has been proposed to record television monitor displays for subsequent study and analysis in the event of a crisis.

While previous monitoring systems have been effective, particularly in conjunction with a single facility, there have been attendant limitations. For example, simple television displays often do not clearly manifest a potential or existing problem. Also, such systems are not susceptible to programmed operation at a remote central processor, enabling an expert to flexibly and remotely monitor a sizeable number of individual locations. Furthermore, in accordance herewith, the present invention recognizes the need to expand the capability of monitoring to accommodate security locations over a widely distributed area. As a further consideration, needs also are recognized for increased communication capability, enhanced displays and expanded control of the displays.

Surveillance of facilities for reasons other then security traditionally involve substantial human involvement. For example, routine inspection of facilities to control quality, regulate and maintain food and/or other standards at franchise and/or company-owned locations (e.g. fast food facilities) or the like, traditionally have required personal visits to such facilities by inspectors employed for such purposes. Unfortunately, more time and expense is incurred in travelling to and from different facilities than is desirable. Moreover, as a practical matter, specific inspectors and/or branch managers are assigned to specific areas, resulting in a need for more inspectors dedicated to inspecting limited areas. The present invention recognizes the need to perform inspections as for controlling quality, etc. at remote locations over a widely distributed area from a central location.

Likewise, the present invention recognizes the need for remote monitoring of deposit and/or withdrawal of funds or executing other transactions at bank vaults, grocery chains or convenience stores, and the like, to deter foulplay and/or prevent burglaries. In addition, the need for conducting discrete or interactive market research is also recognized.

SUMMARY OF THE INVENTION

Generally, the system of the present invention involves monitoring and communicating with a plurality of remote, widely distributed locations, from a central unit utilizing dial-up telephone facilities in today's computer environment with voice quality lines under computer control. Specifically, the dynamic graphics of telephonic video along with audio capabilities are combined with the interactive capability of computers to attain an effective scrutiny or surveillance system. The system of the present invention contemplates use for applications ranging from, prevention of armed robberies and burglaries to quality control and regulation, as of food and sanitation standards, as in food related facilities and the like, discrete or interactive monitoring for market research, monitoring of deposit and withdrawal of funds, as at bank vaults, grocery chains and convenience stores, and so on.

In the disclosed embodiment of the present invention, videophone cameras and speakerphones or regular telephone instruments (for one-way or two-way communication) are placed at remote locations to communicate with a central system that may include several communication and control stations. A video scene display (depicting motion and color) may be provided with graphics, audio and data signals at each communication and control station. The control station may utilize well known image enhancement techniques to allow high resolution images for closer observation.

In one exemplary operating format, identification designations for scrutiny locations are provided in sequence to address a memory for fetching telephone numbers and/or graphic display data. Accordingly, in sequence, scrutiny locations are dialed up via the public telephone system to obtain audio-video communication providing an image of the location scene. Additionally, data associated with the location is graphically displayed for convenient reference. For example, it should be noted that for security applications, response time (e.g., to call the police) is often critical, thus having and displaying the data in conjunction with the video allows for action to be taken immediately if required, either automatically or manually. Note also that the display also may include, the location and graphical data indicative of the floor plan of the premise scrutinized, for example the physical location of entry/exit points and the corresponding streets provided simultaneously with the video scene images.

The sequence of displays may be random or predetermined, as programmed along with intervals of display. For example, a remote location under scrutiny might be observed for thirty seconds once every ten minutes. Alternatively, at a single remote location, varying in observation times for different cameras installed may be programmed. For example, when viewing a bank having a plurality of cameras, the view from a first camera might be taken for twenty seconds, followed by a view from a second camera for ten seconds, then zooming onto a vault that would appear in the view from a third camera for ten seconds.

For each scene display, a graphic display of pertinent data is provided, for example, indicating the telephone number, the location name, e.g. a bank, market or inspection site, the address of the location, the telephone number of the police station serving the location for security applications, key personnel at the location and so on. When monitoring banks and other types of locations susceptible to robbery, the status or nature of the situation, e.g., an "emergency" or "alert", also may be displayed. A detector for detecting situations when a camera is inoperative, as where the lens is covered to prevent observation, may be used to convey another "alert" situation.

On command, either from a scrutiny location or the central station, a communication may be commanded to indicate a situation. Special controls may be instituted enabling manifestations at the scrutiny location to initiate action or alter the display. Special operations also may be commanded through a videophone, either on manual initiative or automatically by sensor apparatus.

A video recorder and/or printer may be located at a remote location or central unit for selectively or continuously obtaining a video recording or computer printout of displays.

Multiple control units may be employed to monitor widely distributed locations with capabilities to route calls to each other in the event all the communication lines are occupied and there is a considerable backlog of calls may also be prioritized.

At each control unit, multiple operators at single monitors may be utilized, with calls sequenced to each operator depending upon the cumulative handling capability of each operator. For example, if a particular operator is handling calls at the average rate of six seconds each, calls to that operator will be sequenced at that rate. Alternatively, a single operator viewing a single monitor or multiple monitors is also contemplated. Furthermore, selective distribution of calls may be appropriate, for example calls reporting on "emergency" situations may be forwarded to a particular operator trained in emergency procedures. Alternatively, calls may be routed to the next available operator. In addition, as the calls are queued in sequence, calls reporting "emergency" or "alert" situations may precede other routing calls in accordance with an override feature.

BRIEF DESCRIPTION OF THE DRAWINGS

A complete understanding of the invention and its advantages may be gained from a consideration of the following description of some disclosed embodiments taken in conjunction with the accompanying drawings, in which.

DESCRIPTION OF THE PREFERRED EMBODIMENT

Figure 1:
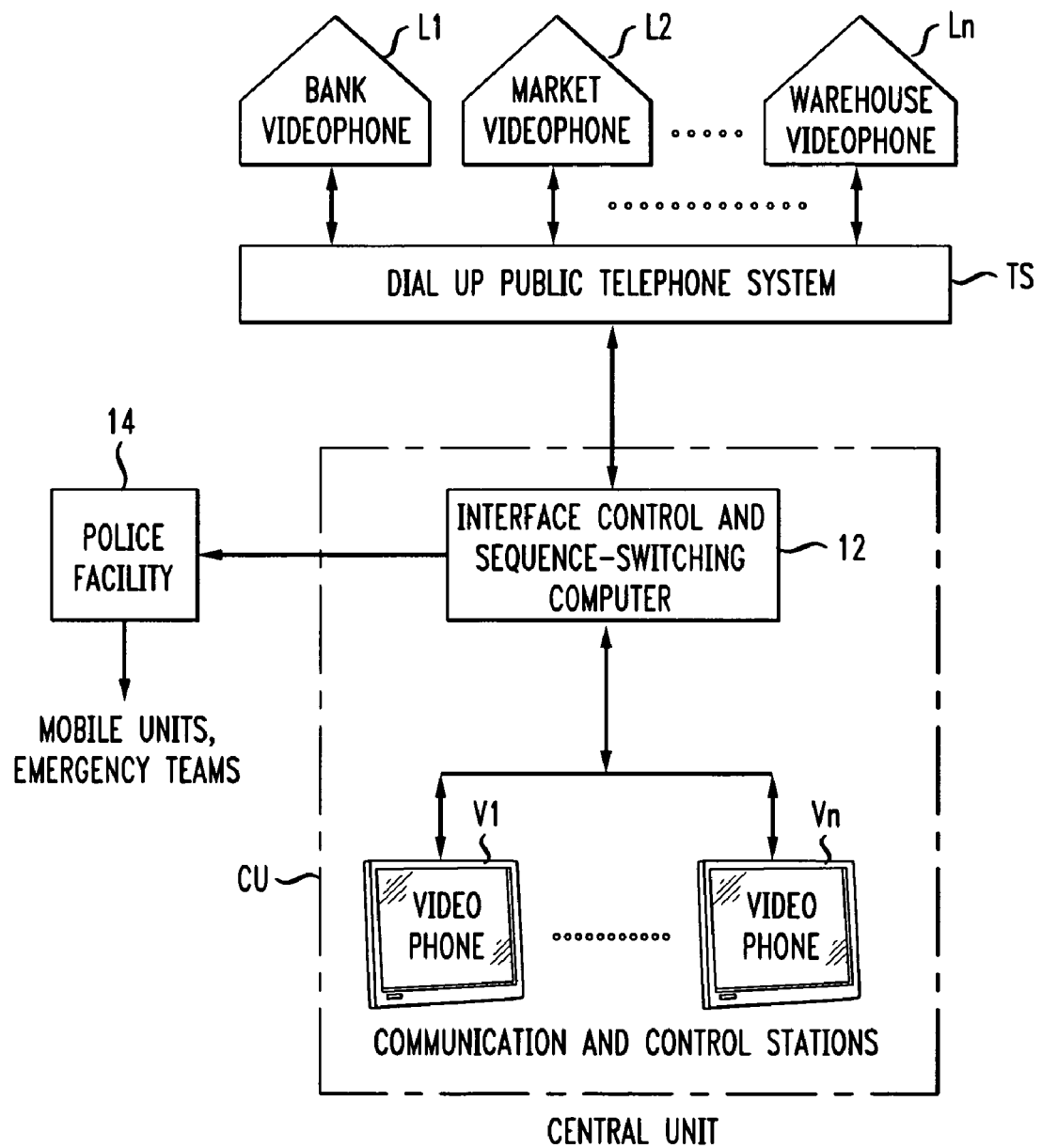
FIG. 1 is a high-level block diagram of one embodiment of the system in accordance with the present invention.

As indicated above, a significant aspect of the system of the present invention is based on recognizing that a dial-up public telephone system may be effectively utilized for scrutiny communication between a plurality of remote scrutiny or surveillance locations and a central station. More specifically, it has been recognized that for an effective security or surveillance system, dial-up voice quality lines, such as standard analog lines, may be employed in conjunction with videophone equipment, computer facilities, sensing apparatus and various forms of telephonic equipment as voice generators, auto dialers and D-channel or in-band signalling apparatus for example. In that regard, a dial-up public telephone system TS is illustrated in FIG. 1 (upper central) affording effective communication between a plurality of remote locations L1–Ln and at least one central unit CU.

The remote locations L1–Ln may involve a wide variety of scrutiny or surveillance locations, for example, markets such as grocery chains and convenience stores, banks, warehouses, residences, automatic tellers, restaurants, factories, plants, businesses, parking structures and so on. Essentially, each location L1–Ln is equipped with at least one videophone capability (described below) to provide telephonic signals through the telephone system TS to accomplish a display at the central unit CU. Along with video signal display, under manual or computer control, audio and data signals are employed to supplement and enhance monitoring operations. In that regard, each of the locations L1–Ln may incorporate several video speakerphones (with one-way and two-way communication and echo cancelling), cameras, sensors, switches, automatic dialing devices and computer memory capability for initiating and responding to commands from the central unit CU, as well as, initiating various actions to accomplish change or to accommodate special circumstances.

The central unit CU incorporates a telephonic interface, control and sequence-switching computer 12 coupled to a plurality of videophone monitor stations V1–Vn. Accordingly, in one format, during routine operation, the videophone stations V1–Vn simply provide a sequence of combined audio, scene and graphic displays revealing situations at identified remote locations L1–Ln. In the event of special circumstances manifesting an "alert" or "emergency" situation, for example, one or more of the videophone stations V1–Vn then is initially dedicated to monitoring and communicating with one or more of the locations L1–Ln experiencing a special situation.

The videophone terminals may be supplemented, as for an emergency. Specifically, cellular telephone capability may be provided for independent communication. As indicated below, such capability also may be important at locations L1–Ln.

As suggested above, a special situation, (e.g., "emergency" or "alert") is initiated either from the central unit CU or any one of the remote locations L1–Ln. Essentially, in response to a location-sensed special situation, dial-up operations are initiated to accomplish a "special situation" connection from one or more of the videophone stations V1–Vn so as to monitor and potentially affect the situation at one of the scrutiny locations L1–Ln.

As another consideration, police involvement may be commanded by communication from the computer 12 to a police facility 14 which may in turn afford communication with various police capabilities including mobile units and emergency teams. Alternatively or additionally, under certain conditions, a call is automatically placed to the police facility 14 giving a message in the form of an alarm with data. Specifically for example, under predefined conditions, the control computer 12 actuates an autodialer to dial up the police facility on a specific line. For example, an operator at a terminal might wear an earphone that is coupled to the police call line. Accordingly, on viewing the display, the operator would immediately be in contact with the police and could describe the situation. Note that the involvement of the central unit CU with police alarms can be very effective in relation to both false and true alarms. For example, the police facility 14 might be notified: "no perpetrator is visible but the 'emergency' door is open, we are monitoring."

Furthermore, the central unit CU may automatically place an emergency call (for example, to indicate armed robbery in progress) to the appropriate police department, determined by a database associated with the particular one of the locations L1–Ln at which the incident is occurring, for example by using ANI as described below. In the interim, the operator may describe the situation to the dispatcher at the police department or may be connected directly to the responding patrol car. Alternatively, the operator may actuate an autodialer, such that the autodialer code number (obtained from the central unit database) displayed on the operator's video terminal connects him or her to the appropriate police department. In the event there are complications, the operator may use a regular telephone or a cellular telephone and manually dial the telephone number displayed on the video terminal.

Preliminarily, considering an exemplary sequence of operations with reference to FIG. 1, assume that the location L1, a bank, is entered by a person carrying a gun with an intent to commit robbery. At some point, as described in detail below, the intention of the person may become known and manifest by a command signal, variously generated at the location L1. As a result, telephone equipment at the location L1 is actuated, prompting dial-up operations to accomplish a connection from the bank location L1 through the telephone system TS and the computer 12 to one of the videophone stations V1–Vn. Assume for example that the videophone station V1 is involved. As described in detail below, in such a situation, the called number to the computer 12 (originated by the location L1) indicates the nature of the special situation, e.g., "emergency" or "alert". That is, the nature of the situation is indicated by dialed number identification signals (DNIS) using a capability readily available from the telephone system TS, as for example on the so-called D-channel. The dialed number identification signals (DNIS) may likewise indicate the type of location where the special situation is occurring, for example, where certain monitors at the central unit CU are dedicated only to supermarkets and others only to banks or the like.

It is to be noted that while the D-channel provides one operational configuration, some DNIS and/or ANI (Automatic Number Identification) data signals can be received in-band without D-channel apparatus. In any event, DNIS signals indicate the called number from the bank location L1. With the provided data (e.g. using DNIS for situation, ANI for identification) the computer 12 fetches identification data for a graphic display at the videophone station V1. Thus, the videophone station V1 displays a video scene within the bank location L1 along with graphic data, for example, to indicate: the nature of the special situation, e.g. "alert" or "emergency", the location, key personnel and so on. Of course, image enhancing techniques, as associated with current videophone technology for enlarging the signals received at the central unit CU or to provide higher resolution pictures may be utilized. Accordingly, large monitors may be utilized at the central station for viewing such enhanced images.

Alternately, personnel at the remote location under scrutiny may call a predetermined telephone number for the central unit CU, whereby as disclosed below, the use of ARU (FIG. 9) interactive technology including voice generators can prompt entry by TOUCHTONE® (DTMF padentry) of remote location code number or predetermined situation codes (with DNIS). For example, personnel from the remote location may be given by voice prompts, either live or prerecorded, for example, "Please enter our remote location code followed by the situation code, 1 for emergency or 2 for alert."

By using dedicated communication lines to remote locations L1–Ln, telephones at the remote locations may be configured to answer after a predetermined number of rings, e.g., three rings. Thus, regular polling of the remote locations L1–Ln at selected or random times during the day determines if the line is operational. In the event the line is busy or out of order, an "alert" situation may be communicated to the central unit CU whereby the police may be summoned to investigate the situation at that particular location Ln. Alternately, to save telephone expenses and avoid billing, the central unit CU may initiate a call to determine if a line is operative, but, terminate the call upon making the determination during the initial stage that the situation is normal. For example, the system may terminate a call after two rings rather than wait from an answer at three rings. Also, detectors located at the remote locations L1–Ln could indicate an "alert" situation to the central unit CU, for example, in the event a lens has been deliberately covered to prevent scrutiny. Alternatively, remote locations may provide distinctive or unique audio tones recognized by the central units CU in the event fraudulent replacement of telephones or the like to simulate a normal situation is contemplated by offenders.

As another feature, an incoming line can be designated at the central unit CU, as an 800 line to receive calls from any telephone to prompt scrutiny. For example, a call on the line may be answered by an interface or an operator to be notified to establish scrutiny at a specified location. In that regard, the location might be specified by ANI signals. Accordingly, a person at a security location who becomes aware of a potential danger can simply call the designated number from any telephone to instigate scrutiny.

At the central unit CU, the emergency display continues with the system implementing manual controls as disclosed in detail below. For example, the status of the situation can be altered, various cameras at the location L1 may be selected, scenes may be modified and audio or video may be controlled. Note that the cameras may be of various kinds, for example, wireless, panning, zoom and so on. Also, the cameras may be operated to modify scenes by panning, zooming, tilting or providing freeze frames, as desired. Furthermore, a record (VCR) may be made of all received signals as for subsequent study. Note also that by assigning each of the locations L1–Ln, a distinct DNIS (called number) identification data in the memory can be accessed accurately by the DNIS number if desired.

Recapitulating to some extent, at the central unit CU, multiple operators at single monitors may be utilized, with calls sequenced to each operator depending upon the cumulative handling capability of each operator. For example, if a particular operator is handling calls at the average rate of six seconds each, calls to that operator will be sequenced at that rate. Furthermore, selective distribution of calls may be appropriate, for example calls reporting "emergency" situations may be forwarded to a particular operator trained in emergency procedures. Alternatively, calls may be routed to the next available operator. In addition, as the calls are queued in sequence, calls reporting "emergency" or "alert" situations may precede other routing calls in accordance with an override feature.

To consider the operation of the embodiment in somewhat greater detail, reference will now be made to FIG. 2 generally showing a plan view of a portion of an illustrative bank location. It should be recognized that various other arrangements of cameras may be installed at supermarkets, parking structures, quality control facilities and the like.

Figure 2:
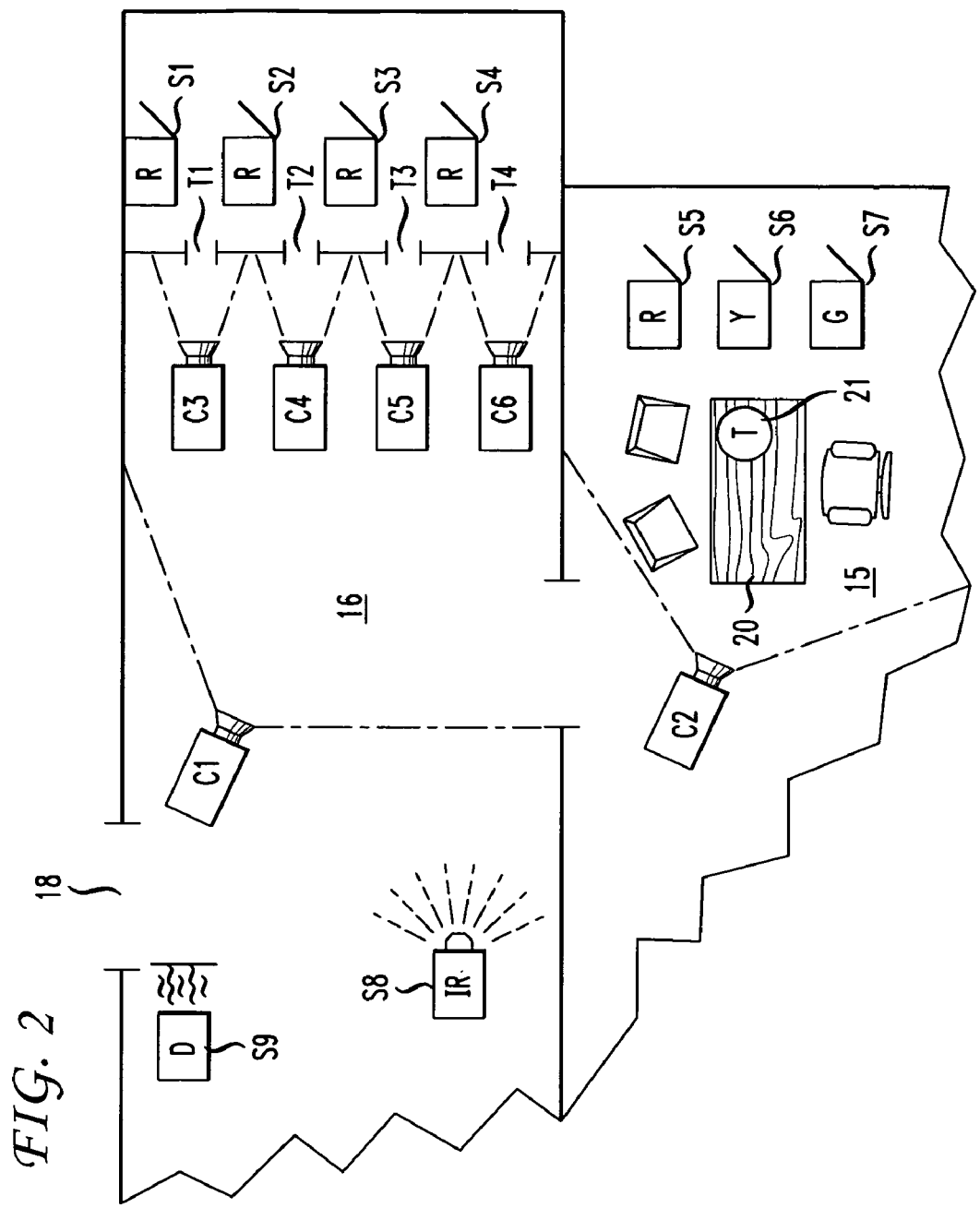
FIG. 2 is a fragmentary diagrammatic plan view of a scrutiny location illustrating sensor and camera locations for an exemplary installation.

FIG. 2 illustrates a layout of video cameras along with sensors and switches that may be employed to indicate situations in the bank. The individual cameras, switches and sensors (including manual switches) may take a multitude of forms. For example, the sensors might be sonic, infrared, visible light, metal detectors, and so on.

As another consideration with respect to an individual location or facility, as described in detail below, the active sensors and cameras may be modified manually or in accordance with an operating schedule for the location. For example, when a bank is closed, it may be prudent to eliminate cashier window monitoring and concentrate on access points. In a related context, a location might be selectively monitored, e.g., access points only, when the installation is "armed", as when alarms are set. When the installation is "armed", a message is conveyed to the central unit CU to commence specific monitoring. Alternately, a location may be monitored at specific preprogrammed times, controlled by a clock. For example, a select bank may be monitored between 10:00 am and 4:00 pm. Additionally, at that bank location, varying observation times for different cameras may be programmed. For example, the view from one camera might be taken for twenty seconds, followed by a view from another camera for ten seconds, then zooming onto a vault that would appear for ten seconds.

In the context of an ATM site, motion detectors may be utilized to detect approaching individuals, whereby the motion detector upon detecting an individual initiates contact with the central unit CU for viewing. Alternately, entry of a PIN (personal identification number) by an ATM customer may likewise initiate contact. It is also contemplated that initiating contact with the central unit CU could be controlled by the clock, such that the central unit CU may be configured only to receive calls at select intervals of time, for example between 7 p.m. and 12 a.m. Additionally, the system may be configured such that DNIS and ANI communication features cross reference with the clock prior to answering. For example, if the present time is between 5 p.m. and 10 p.m., select calls are not accepted.

Considering FIG. 2 in greater detail, four teller windows T1–T4 are illustrated (right) in a room 16 adjacent a desk area 15 indicated to be partially enclosed. At the other side of the room 16, an entrance 18 is represented. Thus, in a somewhat simplified traditional arrangement, bank customers enter the room 16 through the entrance 18 to transact business either at one of the teller windows T1–T4 or in the area 15.

Of course, the extent of coverage and the position of cameras is expected to vary widely in different installations. However, in the exemplary arrangement of FIG. 1, a camera C1 provides a wide-angle view of the transaction area. A camera C2 covers the area 15 and cameras C3, C4, C5 and C6 are concentrated respectively on the teller windows T1, T2, T3 and T4. The cameras C1–C6 are adjustable and as a consequence may zoom, pan, tilt and freeze frame with reference to a subject. Thus, considerable flexibility is afforded in monitoring the room 16. Note that cellular telephone techniques may be employed in relation to the locations L1–Ln, as for example, the camera C1 might be backed up by a cellular phone arrangement to function in the event of a telephone line severance. Battery backup, of course, is contemplated.

Various forms of actuators or sensors may be provided to indicate a special or urgent situation at the bank. For example, as illustrated in FIG. 2, manual silent alarm switches S1–S4 are provided at a convenient location for each of the teller windows T1–T4 respectively. Typically, the switches S1–S4 would be positioned to enable subtle actuation. In FIG. 2, the switches S1–S4 are labelled "R" (red) to indicate an "emergency" situation on actuation. That is, if a teller actuates one of the manual switches, a realistic possibility exists that the teller is being held up and a "red" or "emergency" situation is indicated.

The area 15 containing a desk 20 is provided with three manual switches, S5, S6 and S7, each to manifest a situation of a different type. Specifically, the switch S5 indicates an "emergency" or "red" situation, the switch S6 indicates an "alert" or "yellow" situation and the switch S7 indicates a "routine" or "green" situation.

The desk 20 also is equipped with a telephone instrument represented by an encircled letter "T" and designated "21". The telephone 21 is coupled into the system and may be employed to interface the central unit CU (FIG. 1) as described below.

In addition to manual switches, automatic sensors are represented in FIG. 2. Specifically, a switch S8 comprises an infrared sensor for detecting motion. Of course, various forms of sensors and various operating philosophies may be implemented. For example, in the arrangement of FIG. 2, the absence of motion (routine business) within the room 16 actuates the sensor switch 18 to indicate an alert situation. Alternatively, motion in certain areas, at certain times may indicate an emergency.

Switch S9 is embodied as a doorway metal detector. Accordingly, passage through the entrance 18 by a person bearing a weapon actuates the switch S9 to command an "alert" or "yellow" situation. As indicated, commanding any situation actuates the system to establish communication from the bank location L1 to the central unit CU to initiate monitoring, recording and selective involvement.

To consider the system of the disclosed embodiment in somewhat greater detail, reference now will be made to FIG. 3 in which previously identified components bear similar reference numbers. Accordingly, the dial-up telephone system (center) is designated TS, scrutiny locations (right) are designated L1–Ln and a plurality of central units CU1–CUN are connected through a central unit switch CUS. Generally, the switch CUS may implement various control formats to selectively allocate communications between the central units CU1–CUN. In accordance with one exemplary system, the multiple central units CU1–CUN may be employed to monitor widely distributed locations with capabilities of routing calls to each other. Also, each of the central units CU1–CUN, multiple operator may be used such that calls are sequenced to each operator depending upon the cumulative handling capability of each operator.

Recapitulating to some extent, the dial-up telephone system TS accomplishes communication through the switch CUS between a select central unit CU1–CUN end the individual scrutiny locations L1–Ln. The communication may be initiated either by the central unit CU1 or any one of the scrutiny locations L1–Ln. Assume connection to the central unit CU1.

Typically, during intervals of routine operation, the central unit CU1 initiates contact with the scrutiny locations L1–Ln in sequence (either predetermined, such as when scheduled, or randomly, such as on demand or randomly scheduled) to afford momentary viewing of scrutiny locations. However, it should be noted that continuing scrutiny, i.e., clocked scrutiny for an entire eight hour shift also is likely for certain various high risk locations.

Upon the occurrence of a condition at one of the scrutiny locations L1–Ln suggesting or indicating a special situation, or merely as a check, a command signal may be initiated either manually or automatically to accomplish the communication.

Such a command signal indicates either a "routine" situation (green), an "alert" situation (yellow) or an "emergency" situation (red).

Figure 3:
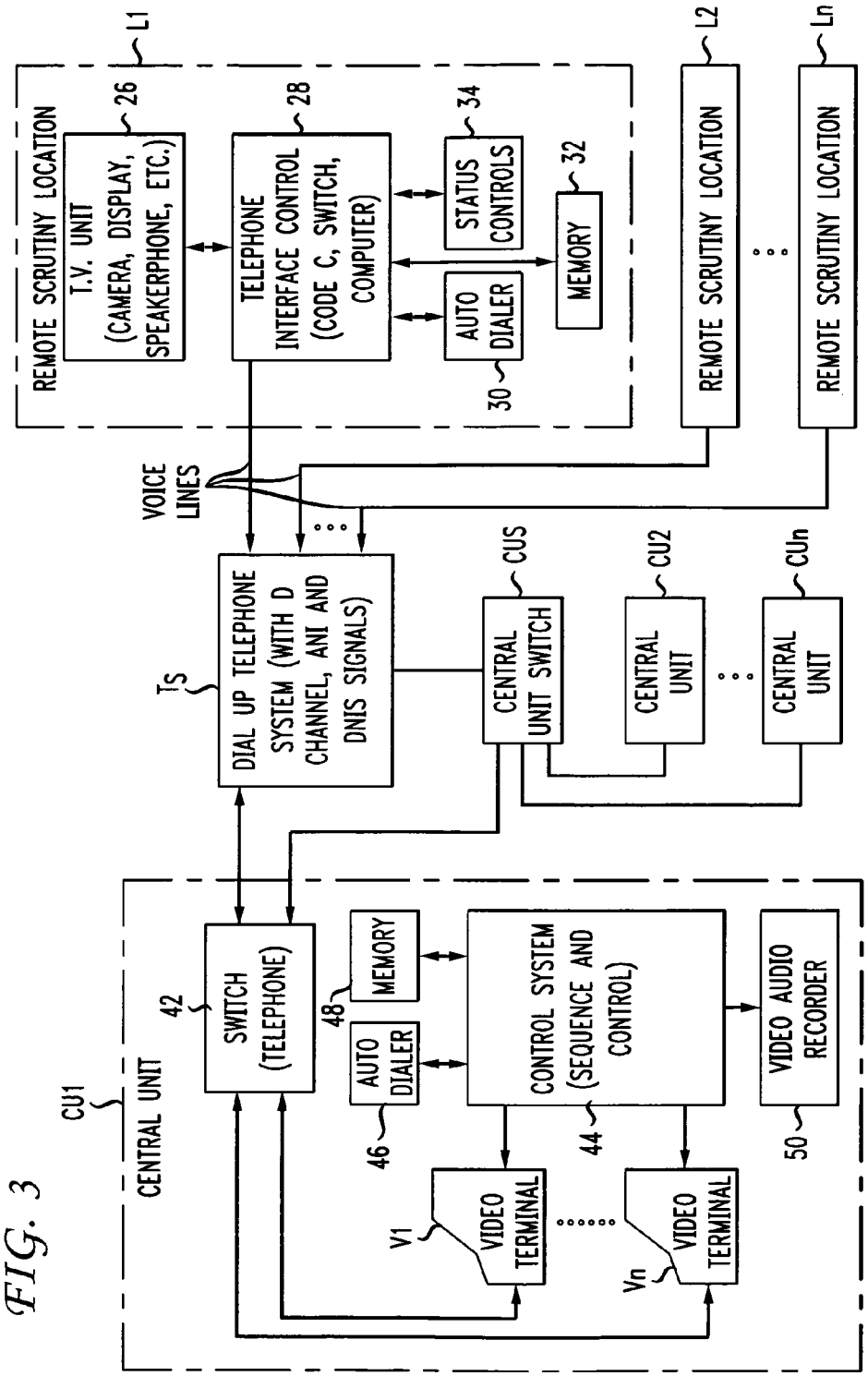
FIG. 3 is a more detailed block diagram of basic components in an exemplary system of the present invention.

Only one of the scrutiny location structures L1–Ln is disclosed in detail in FIG. 3. Specifically, in the scrutiny location L1, at least one television unit 26 is provided for producing a television signal representing both video and audio. That is, as illustrated in FIG. 2, several separate television units may be provided to cover different areas of a scrutiny location or provide different aspects. Each unit 26 includes the elements of a videophone, e.g. camera, display, speakerphone, etc., along with control capability as disclosed below. Audio and video signals from the television unit 26 (along with any duplicate units) are provided to a telephone interface control unit 28 incorporating a videophone encoder-decoder (CODEC) chip set, a telephone switch and a control computer. A form of the interface unit 28 is treated in detail below. However, the unit has the capability to accommodate videophone operation along with telephone switching and a variety of control functions.

The interface unit 28 also is connected to several operating devices including an auto dialer-30, a memory 32 and status controls 34. These structures are disclosed in somewhat greater detail below; however, the auto dialer 30 may take any well known form of such units as may the memory 32. The status controls 34 may take a multitude of different forms as considered to some extent with reference to FIG. 2. That is, the status controls 34 may include manual switches, photoelectric sensors, infrared sensors, visible light sensors, metal detectors and even threshold sonic detectors. For example, a sonic detector might signal a gunshot to command an emergency status.

The interface unit 28 is also connected to a video recorder (VCR) 35, which may be set to record continuously or intermittently to provide historical data for fraud prevention or the like. On receiving a request command, for example from the central unit CU1 (shown in detail), the video recorder 35 may transmit compressed video signals of the recording to the central unit CU1. Alternatively, employees at the remote scrutiny location L1 may initiate transmission of compressed video signals when indicating an emergency situation. Of course, continuous recording by the video recorder 35 may be suspended when the central unit CU1 initiates contact with the scrutiny location L1 and during momentary viewing thereof. In the event, the scrutiny location L1 is at an ATM site where each transaction is typically recorded, such video recordings or portions thereof may be transmitted to the central unit CU1 upon receiving a command therefrom.

At locations where multiple cameras are positioned, a single video recorder 35 may be connected to the multiple cameras via a switching device (though shown as part of the video recorder 35, may be separate therefrom) to control and sequence the recordings from the cameras. A switching device such as the intelligent sequential switcher manufactured by SONY, under Model No. YS-S100 may be used to control and sequence multiple recordings.

Alternatively, in some situations where a video recorder is connected at the central unit CU1, select frozen frames of viewings or a specific time period of each momentary viewing can be recorded, for example two seconds (specific time period) of the twenty seconds (momentary viewing) for each remote location.

Likewise, the interface unit may be connected to a printer 37 for providing a printed record of each predetermined or random momentary viewing, indicating the date, time, location, period of monitoring, etc. Thus, a detailed hard-copy record is developed.

To consider an exemplary operation sequence within the location L1, upon the actuation of one of the status controls 34 (special situation signal), the unit 28 fetches two distinct telephone numbers, i.e., a called number and a calling number. The called number comprises one of the numbers for establishing communication with the central unit CU. Of several such numbers, each indicates an individual status. For example, called numbers for the central unit CU might be assigned as indicated by the following chart:

CHART 1

| Remote Location Calls | | |
| --- | --- | --- |
| Called No. | Status | Time |
| 555-1111 | Routine (G) | Preset |
| 555-2222 | Alert (Y) | Hold-Manual Control |
| 555-3333 | Emergency (R) | Hold-Manual Control |

Thus, the unit 28, by selecting a calling number for the central unit CU1, indicates status at the central unit. Accordingly, if a status control 34 at the scrutiny location L1 detects an emergency situation, the unit 28 commands the memory 32 (look-up table) to provide a telephone number "555-3333" for actuating the auto dialer 30 to produce dial signals (through unit 28) to the dial-up telephone system TS.

Accordingly, connection is established with the central unit CU indicating an "emergency" status, i.e. "condition red". The "emergency" signal would be indicated at the central unit CU by Dialed Number Identification Signals (DNIS) utilizing facilities readily available and provided by the dial-up telephone system TS through the so-called D-channel or in-band signalling apparatus.

The dial-up telephone system TS also provides Automatic Number Identification (ANI) signals indicating the calling number on the so-called D-channel or in-band signalling apparatus. In the disclosed embodiment, such signals identify the location of the remote scrutiny station L1 to the central unit CU1. Note, that the memory 32 may provide alternate forms of calling signals commanding a specific outgoing line from the telephone interface and control unit 28 to afford additional communication. For example, ANI signals alternately might command either status, other situations or related data.

Upon attaining communication with the central unit CU1, the remote scrutiny location L1 is in videophone communication with the central unit CU1. Specifically, the television unit 26 provides videophone signals through the unit 28 and the dial-up telephone system TS to the central unit CU1 to manifest the current circumstances in the form of a scene and graphics and in some cases audio signals.

Summarizing to some extent, upon the actuation of a command signal at a scrutiny location, e.g. scrutiny location L1, a connection is established from the scrutiny location L1 to the central unit CU1 through the telephone system TS. Additionally, signals are provided (ANI and DNIS) at the central unit CU1 to indicate the specific identification of the scrutiny location L1 and the status affording the basis for the call.

As another aspect hereof, the system may test conditions at a location prior to, or as part of providing a display.

Human involvement may accordingly be reduced. For example a video picture can be digitized and recorded to provide a video recording that indicates a scene at a specific instance of time. If that scene does not change, to some extent, the assumption is that it is secure. Accordingly, after the time of recording the scene, another video picture is provided, digitized and compared with the first picture. Unless the change amounts to a predetermined percentage or part of the total picture, the location is assumed to be secure. As an example, a closed vault door may be the subject of the picture.

If it is opened on a subsequent check to indicate a substantial change in the picture, an emergency is indicated and the system should be activated to provide a display. Additionally, depending upon monitoring periods, if a video picture is compared with a previous one, for example after ten minutes, and only a change of 5% is perceived, it can be safely concluded that everything is normal. Accordingly, transmission of video pictures to the central unit CU may be suspended.

Such comparator circuitry may be provided at the remote locations L1–Ln or at the central unit CU1.

Within the exemplary central unit CU1, a telephone switch 42 accommodates both incoming and outgoing traffic serving a plurality of video display stations or terminals V1–Vn. Each of the terminals V1–Vn incorporates the capability of a videophone (CODEC chip set, display, camera, speakerphone, keypad, control, etc.) along with additional control functions as described below. In that regard, the display terminals V1–Vn may incorporate relatively large monitors and a variety of other enhanced apparatus for more effective prolonged human use.

Each of the video terminals V1–Vn are connected to a control system 44 that is in turn connected to an auto dialer 46, a memory 48 and a video audio recorder 50 (video and audio capability). Essentially, these units are time shared by the video terminals V1–Vn. In that regard, capability may be provided in the control system 44 to transfer connections to locations L1–Ln as between the terminals V1–Vn. For example, in that regard, operators at the terminals V1–Vn may be specialists for various conditions with designated calls routed to specific terminals and transfer capability to accommodate changes in situations.

Figure 4:
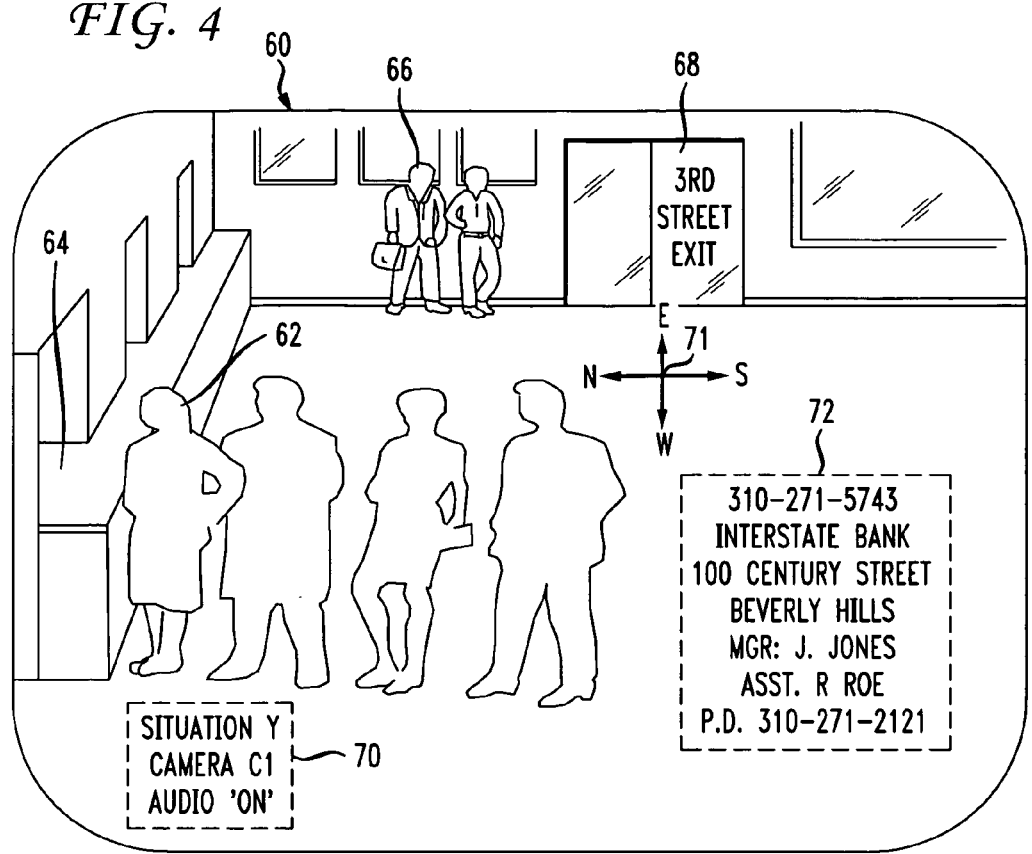
FIG. 4 is a graphic representation of a display of the system of FIG. 3.

Recapitulating, as explained above, the exemplary central unit CU1 functions both to initiate outgoing calls and receive incoming calls for flexibly monitoring the remote scrutiny locations L1–Ln. To continue with the explanation of an incoming call, when the telephone switch 42 in the central unit CU1 receives an incoming call, it will be connected to one of the video terminals V1–Vn. Concurrently, incoming data signals (DNIS and ANI) are passed to the control system 44. From the memory 48, the system 44 fetches the identification of the location L1 and the designated status, e.g., "emergency", "alert", or "routine". With such signal represented data, the control system 44 may select a specific one of the terminals, e.g. terminal V1, to handle the call. The control system 44 then provides computer graphic signals to the selected video terminal V1 supplementing the coupled television scene display. Specifically, the video terminal V1 presents a viewer with a composite display of a scene at the location L1 along with appropriate graphic data. For example, assuming the location L1 is a bank branch office, the display by the terminal V1 could be somewhat as represented in FIG. 4. In that regard, the display has been simplified for purposes of explanation, particularly with regard to the room interior.

FIG. 4 shows the screen 60 of the terminal V1 depicting the scene inside the bank at the location L1. In the foreground, a group of people 62 are indicated to be standing in line at a teller window 64. Other people 66 are indicated to be standing near an entry door 68. As shown, note that in the scene, the graphics also indicate the door is located on 3rd Street. It should be noted that a graphical cursor 71 indicating N/S/E/W is displayed. A considerable amount of other graphic information supplements the scene display as indicated, specifically in the form of control status data 70 and location identification data 72.

Generally, the elements of the graphic data are self-evident. However, the first line of the identification data 72 indicates a telephone number for the scrutiny location, the next several lines indicate the name of the facility at the location L1, the address, and key personnel. Finally, the last line of the identification data 72 indicates a telephone number for the police station serving the location L1.

Typically, upon the initiation of communication between one of the display terminals V1–Vn and one of the scrutiny locations L1–Ln, the identification data 72 is presented and remains displayed without change. However, the control status data 70 (lower left) may be varied, depending on specific operating conditions as will now be considered.

As illustrated in FIG. 4, the control status data 70 reveals an "alert" status (situation "yellow"), the scene being presented by the camera C1 and the outgoing audio (central unit CU to location L1) being "on". Typically, the outgoing audio would not be active on initial contact. However, the initial conditions would be established and programmed depending on location, schedule, etc., the program being provided by the memory 48 (FIG. 3). However, after connection, the conditions may be varied to accommodate different situations as perceived either at the terminal V1 in the central unit CU1, or at the location L1. For example, a manager at the desk 20 (FIG. 2) may use the telephone instrument 21 to command a change. In a similar way, changes can be commanded from the terminal V1 as will now be considered in detail.

Figure 5:
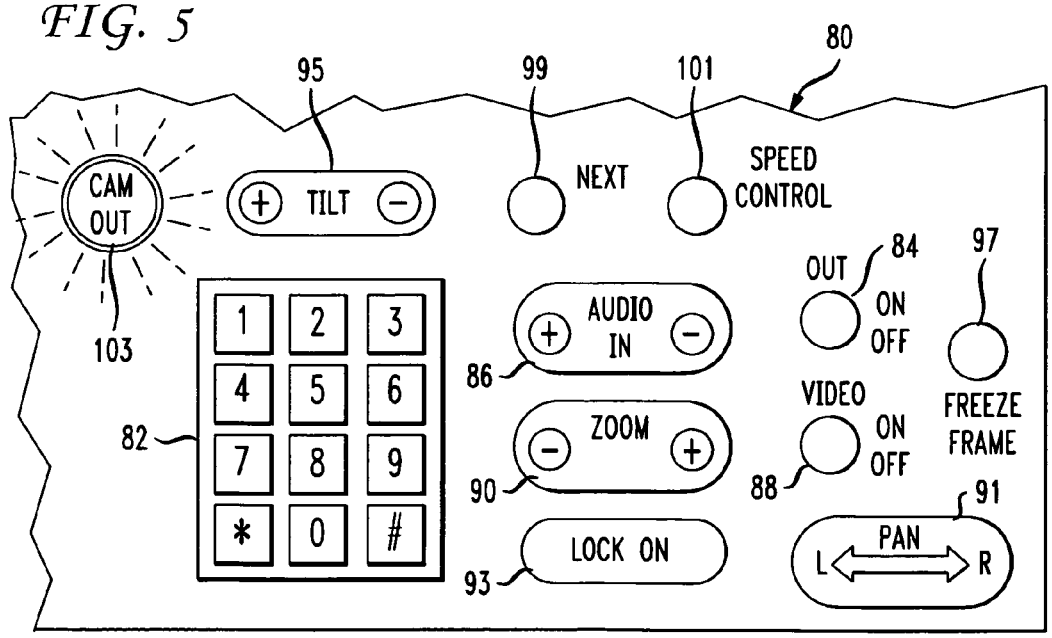
FIG. 5 is a graphic representation of a portion of the control panel of an element in the system of FIG. 3.

Recapitulating, the terminal V1 (FIG. 3) has been described to be in communication with the location L1 to provide a display as illustrated in FIG. 4. In addition to the display, the terminals V1–Vn incorporate a substantial control panel that my be embodied as part of a personal computer keyboard. Specifically, the control panel for each terminal V1–Vn includes all the current controls for a videophone, plus dedicated controls relating to the disclosed system. In that regard, in the interest of avoiding undue complications, only a fragment of the representative panel for the terminal V1 is shown in FIG. 5. Note that one panel could be used or could share multiple displays.

Specifically, the fragment of the panel 80 of FIG. 5 incorporates a traditional twelve-button telephone pad 82 bearing the numerals "1" through "0" along with the symbols "*" and "#"for generating DTMF signals in accordance with standard convention. Additionally, various specific controls are provided. An on-off button 84 controls outgoing audio. A toggle 86 controls the volume of incoming audio. An on-off switch 88 controls outgoing video. A pair of toggle switches 90 and 91 respectively control zooming and panning camera operations. A push button switch 93 serves to halt a sequence of displays may be simultaneously displayed from remote locations locking onto the current display (freeze frame) for closer observation to investigate suspicious activity or record data on a suspicious individual for closer observation and in some cases higher resolution at a later time. In addition, another toggle switch 95 controls tilting camera operations and a push button 97 advances the freeze frame for subsequent observation. A pushbutton switch 99 serves to manually advance or request the next display in the sequence of displays. A control switch 101 regulates the speed at which the sequence of displays are viewed. Finally, a signal lamp 103 illuminates to indicate that a video camera has become inoperative. For example, the lens of a camera might be deliberately covered or spray painted at the outset of a robbery. As disclosed below, the system should then advance to another camera within the remote location.

Recognizing that communications to the terminal V1 can be variously initiated, the control panel 80 enables various commands. Again, recognize that communication may be established in a program sequence as described in more detail below or originated at either the central unit CU or a remote location L1–Ln. Generally, by using the telephone keypad 82 on the panel 80, various control functions can be accomplished as indicated by the following chart.

CHART 2

| Command | Name | Operation |
| --- | --- | --- |
| 30 | Status | Designates a status command is to follow |
| 31 | Routine | Sets "routine" status |
| 32 | Alert | Sets "alert" status |
| 33 | Emergency | Sets "emergency" status |
| 40 | Camera | Designates a camera command is to follow |
| 41 | Camera C1 | Sets camera C1 active |
| 42 | Camera C2 | Sets camera C2 active |

CHART 2-continued

| Command | Name | Operation |
| --- | --- | --- |
| 43 | Camera C3 | Sets camera C3 active |
| . | | |
| . | | |
| 50 | Synthesized Voice | Designates a synthesized voice command is to follow |
| 51 | Observed | Actuate voice generator to announce: "You are being observed . . . " |
| 52 | Recorded | Actuates voice generator to announce: "You are being recorded . . . " |
| . | | |
| . | | |
| # | Execute | Execute entered command |
| * | Clear | Clears any entered or partially entered command |
| 11* | All Clear | Clears all commands to receive fresh operating commands |

To consider some examples, if the observer of the screen 60 (FIG. 4) perceives that the situation has become dangerous, touching the keypad buttons for "3" and "0" followed by the buttons designated "3" and "3" will change the represented status to situation "red" (R), i.e., "emergency". Note that as indicated in the display (FIG. 4), the status situations are indicated as a part of the status data. Also, the status data may be presented in three different colors, e.g. red, yellow and green, to indicate the situation somewhat more emphatically.

To consider another circumstance, in viewing a display on the screen 60 (FIG. 4), the video may be lost or the observer at the terminal V1 (FIG. 3) may wish to concentrate on a specific one of the teller windows T1–T4 as represented in FIG. 2. For example, it may be desirable to actuate the display of camera C3 (FIG. 2, upper right) directed at the teller window T1. Accordingly, the keypad 82 is actuated first by touching buttons or keys "4" and "0" followed by the numerals "4" and "3" to actuate the camera C3. As a result, the display of the screen 60 is shifted to a view of the teller window T1.

To consider still another control operation, observation of the display on the screen 60 (FIG. 4) may suggest that some audio communication may be desirable from the video terminal V1 to the bank location L1. Initially, the audio "on-off" button 84 (FIG. 5) would be actuated to initiate audio communication. In that regard, note that audio communication from the bank to the video terminal V1, i.e., audio "in" is usually active.

After actuating the outgoing audio to the bank location L1 (FIG. 1), the operator at the terminal V1 may elect between speaking an audio message or selecting a prerecorded audio message from memory and utilizing a voice generator as will be explained in greater detail below. In that regard, some situations may be particularly tense and a desirable procedure would involve simply indicating to those present in the bank location L1 that the entire scene is under surveillance and a video record is being produced. Activating an audio record carrying the message in a powerful and confident voice may be the prudent course of action. Under such circumstances, as indicated in the above chart of commands, the operator may simply touch the buttons "5", "0" to command a synthesized voice message, then touch a specific command for a particular message. For example, the buttons of "5" and "1" command the vocalization of a message "You are being observed . . . ".

Note that after each command is issued, the operator must touch the numeral or pound symbol ("#") button to execute the entered command. To clear any entered or partially entered command, without execution, the operator simply touches the asterisk ("*") button. Finally, clearing the operating commands totally involves touching the code: "1, 1, *".

With the system in a cleared state, any of a variety of operational commands may be given, for example, a partial list of such commands is:

CHART 3

| Command | Name | Operation |
|---------|------|-----------|
| 20 | Op. Comm. | Operational commands to follow |
| 21 | Pre. Seq. | Revert to sequencing a predetermined program of locations |
| 22 | Rand. Seq. | Revert to sequencing a random program of locations |
| 23 | Set Call | Dial up a select location as identified by a four-digit number to follow |
| 24 | Police | Actuate police connection |
| . | . | . |
| . | . | . |
| . | . | . |

As an example, touching the keypad 82 (FIG. 5) to enter "2" and "0" indicates an operational command follows. Thereafter, entering "2" and "1" prompts the system to revert to a sequencing operation as described above in accordance with a predetermined program scheduling communication and monitor displays of individual remote locations. Alternatively, entering the numerals "2" and "2" initiates another form of sequencing in which the control computer provides a random program (within limits) to randomly observe or monitor remote locations. Note that dwell time may vary widely or be programmed for individual locations L1–Ln.

As other operating examples, entering the numerals "2" and "3" indicates that the operator will next enter a four-digit number designating a particular remote location thereby providing a memory location address from which a telephone number for the location will be fetched and employed to actuate an automatic dialer as described below. Finally, as another example, indicated in the above chart, actuating the keypad 82 (FIG. 5) to enter the numerals "2" and "4" establishes connection with the police facility 14 (FIG. 1) thereby bringing such a facility into communication with the system in various arrangements.

Quality control monitoring involves rather different operations. For example, an inspector observing a plurality of fast food sites, such as "McDonalds", may wish to instruct an employee, "Put on your food handling gloves," by use of the on-off button 84. Alternatively, the inspector may request inspection of the facility for regulation purposes.

Along the same lines, routine supervision of transactions, e.g. deposits and withdrawals of funds, at bank vaults, grocery chains or convenience stores, or the like can be remotely monitored and even recorded to deter foulplay.

Similarly, at banks, supermarkets or the like, market research can be performed by monitoring all the transactions and observing people's reaction to new interest rates, products, etc. The on-off audio button may be used for interactive communication with customers, if desired.

Figure 6:
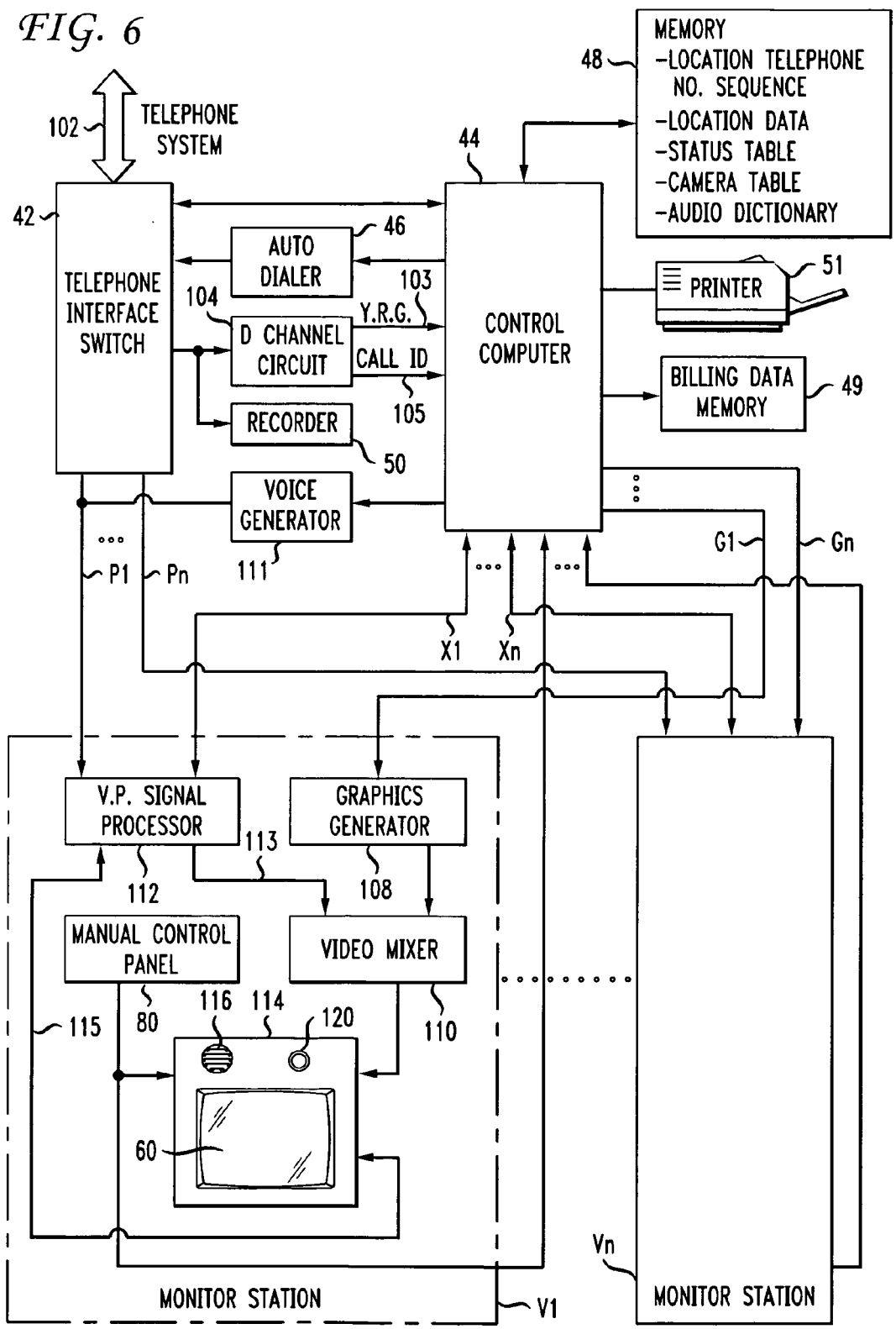
FIG. 6 is a somewhat detailed block diagram of the central station portion of the disclosed system in accordance with the present invention.

From the above descriptions, it is apparent that the disclosed system utilizes videophone technology in combination with other telephone system technology along with computer control and graphics technology to accomplish effective security monitoring and, to some extent, active involvement. To explain the system in greater detail, the structural components now will be considered. First, the central unit CU is treated with reference to FIG. 6. As mentioned above, elements previously described bear similar reference numerals. Accordingly, a plurality of individual monitor work stations V1–Vn for involved security monitoring are represented at the bottom of FIG. 6. As the terminals are similar, only V1 is shown in any detail. As indicated above, the terminals V1–Vn are collectively served by the other apparatus of the central unit as illustrated in FIG. 6.

To accomplish a complete understanding, the explanation of the central unit of FIG. 6 now may best be pursued by assuming certain circumstances and proceeding to describe the attendant operation concurrently with the introduction of any fresh components. Accordingly, inbound calling operations initially will be treated followed by a comprehensive treatment of outbound calling procedures.

Initially, as described above, inbound calls are received through the telephonic interconnection 102 (FIG. 6, upper left) accommodated by the interface telephone switch 42 as well known in the art. The information signals accompanying calls (ANI and DNIS) are passed to a D-channel circuit 104 as for decoding. That is, as indicated above, the calling number signals (ANI) identify the calling remote location. The called number signals (DNIS) indicate the state or situation prompting the call, e.g., designations "green", "yellow" and "red" respectively indicating "routine", "alert" and "emergency" situations.

Information carried by the ANI and DNIS signals is supplied from the circuit 104 to the memory 48 upper right through the control computer 44. Specifically, a line 103 carries the situation information (DNIS) while a line 105 carries the call identification (ANI-Caller I.D.). Consider the ANI processing initially.

From the control computer 44, the representative ANI signals address the memory 48 to fetch detailed graphic information, specifically the identification data 72 as illustrated in FIG. 4. A signal represented form of such data is supplied from the control computer 44 through one of a series of graphic lines G1–Gn to a selected one of the monitor stations V1–Vn. Application to the station V1 will be assumed in pursuing the explanation, however, details of such selection are treated below.

Within the station V1, the graphic identification signal data on a caller is received by a graphics generator 108 for processing into a video signal that is supplied to a video mixer 110. The output from the video mixer 110 drives a monitor 114 to provide a scene-graphics display.

As a concurrent operation with the ANI signal processing, the DNIS signal representation also is applied by the control computer 44 to the memory 48 for fetching an indication of the location status. Signal representations of the status also are supplied from the computer 44 to the graphics generator 108 and produce a situation representation (see status data 70, FIG. 4). Thus, the video mixer 110 receives comprehensive graphic signals for display concurrent with the picture scene representation, the signal source of which will now be considered.

With the completed telephonic connection from the remote location (FIG. 1), as assumed above the specific incoming line is coupled to the monitor station V1. Specifically, the videophone signals are received by a videophone signal processor 112 (FIG. 6) for driving the video monitor 114 incorporating the display screen 60. Specifically, the signal processor 112 is coupled to the video mixer 110 to provide the scene content of the display.

The videophone signal processor 112 incorporates a video CODEC along with computing capability and may take the form of an AVP1000 video CODEC chip set as available from AT&T. Essentially, the CODEC chip set accomplishes videophone operation and consists of a video encoder, a video decoder and an internal system controller. As known, the system controller provides and receives: video data, audio data and data signals. In that regard, the videophone processor 112 is illustrated with cable (multiple path) connections. That is, path or line P1 is one of a series of lines P1–Pn carrying an encoded videophone signal between the switch 42 and the processor 112. A line 113 then carries received video data to the video mixer. A line 115 (bus or cable) carries several other signals to the monitor 114, specifically, transmitted and received audio, transmitted video and data signals. The videophone processor 112 also is connected to the control computer 44 for data signal flow.

In addition to the display screen 60, the monitor 114 incorporates a speakerphone 116 and a video camera 120. As indicated above, signals from the speakerphone 116 and the video camera 120 are selectively transmitted to the remote location through the line 115 and the processor 112 under manual control.

Recapitulating to some extent, on receipt of an incoming call, ANI and DNIS data is processed along with the subsequent encoded videophone signal for application to a select monitor station to provide the picture display (scene and graphics) as generally represented in FIG. 4. Upon such an occurrence, the manual control panel 80 (FIGS. 5 and 6) adjacent the monitor 114 may be utilized to accomplish a number of operations including: changing the status, selecting a particular camera and controlling the zooming or panning of the camera, actuating either audio or video manifestations at the bank location L1, effecting a police connection, and so on. Accordingly, any of a number of courses may be pursued under the control of a trained operator including supplements to the video record as in the form of comments. As indicated above, for example, the operator can command a synthesized voice message to be delivered audibly at the location L1. Specifically, voice data is drawn from the memory 48 (audio dictionary), a message is formulated by the central computer using well known techniques of the art and provided to a voice generator 111. The audio output from the voice generator lll is processed by the processor 112 or, as illustrated, by the telephone interface switch 102. In any event communication is to the location L1.

In the operation of the system embracing the exemplary formats as treated above and below, a record is made for billing purposes. That is, a billing data memory 49 (upper left, FIG. 6) and a printer 51 are controlled by the computer 44, recording all transactions in relation to billing charges. Such data can be variously processed at different times.

To this point, consideration has been primarily directed to the treatment of incoming calls. Alternative modes involve the placement of outgoing calls under manual control and the automatic operation to provide a sequential display from remote locations L1–Ln. Such operations next are treated in detail.

Consider first the functions of the system when an operator manually initiates a call from the monitor station V1 to one of the remote scrutiny locations, e.g., location L1. Specifically, assume the need to establish a connection from the monitor station V1 to the remote bank location L1 initiated by an operator at the monitor station V1. Under such circumstances, the operator actuates the manual panel 80 (FIGS. 5 and 6) using selected commands (chart above) as will now be considered.

At the outset, a command "11*" clears the monitor station for manual control. Next, a command "20" indicates that operating commands are to follow. The operator next touches "23" to indicate that a specific remote location number will follow. Continuing, the operator touches the four-digit address signal for the location L1 in the memory 48. As a result, the control computer 44 (FIG. 6) addresses the memory 48 to fetch the telephone number for the bank location L1. The telephone number is supplied from the memory 48 to the control computer 44 which actuates the auto dialer 46 to provide the dial-up signals on an off-hook line provided in the coupling 102 to the dial-up telephone system TS (FIG. 1). Typically, at the location L1 a dedicated line will accept the communication.

As with all dial-up operations, certain conditions are predetermined. That is, a particular camera (and settings) is specified and a tentative status also is specified. Typically, unless the status is specified, the dial-up connection will provide a "routine" or "green" status indication and utilize a camera positioned to provide a wide-angle field of view. Of course, as indicated above, the operator can immediately modify the initial predetermined conditions utilizing the control commands as explained above. Thus, under manual control, the established communication may be preserved for a period or terminated after a quick check of the situation. Manual control continues until the system again is set into an automatic sequence mode.

For most operating systems, it is likely that manual operation will not dominate the system. Rather, during much of the time, the monitor stations will collectively be programmed to automatically provide a sequential display of the remote locations L1–Ln. Thus, at the termination of an interval of one-to-one operation, a command will be given to resume sharing in the sequence monitoring. Specifically, as indicated above, a command of "21" will actuate the system to the predetermined program of locations or alternatively, a command "22" will actuate a random sequence operation.

During the sequential operation, the control computer 44 (FIG. 6) fetches telephone numbers for the remote locations L1–Ln from the memory 48 in a sequence, actuates the auto dialer 46 accordingly, and assigns the resulting connections to one of the monitor stations V1–Vn. An observation format may be implemented, however, in any event, after a short interval of operation, e.g. 30 seconds, the control computer 44 terminates the display connection to a station V1–Vn in favor of another waiting connection. The operation results in a sequential display of locations at each of the monitor stations V1–Vn.

Figure 7:
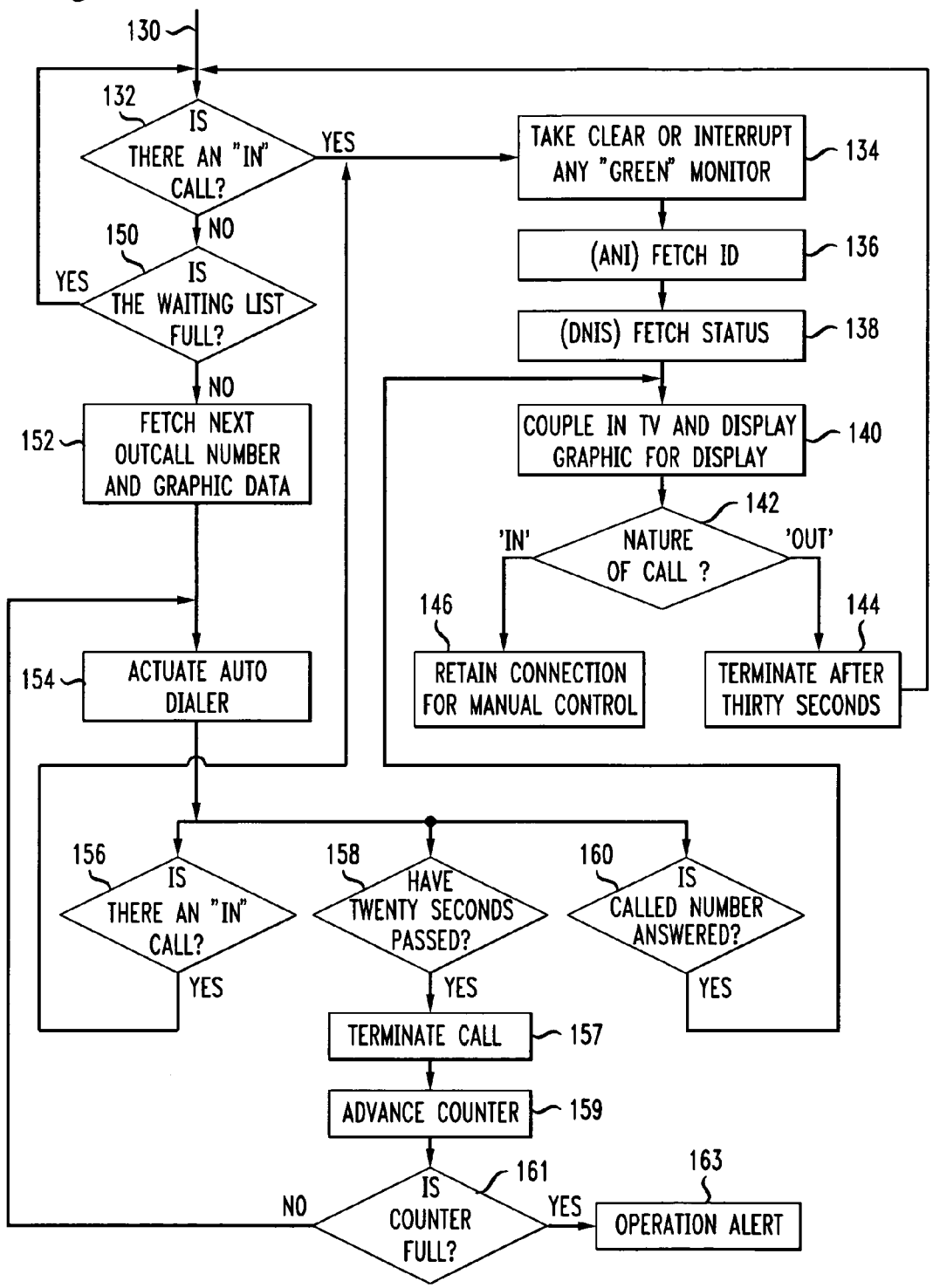
FIG. 7 is a logic diagram illustrating the operation program of the system of FIG. 6.

A logic program indicating the control operations of the control computer 44 will now be treated with reference to FIG. 7. The program is entered at a line 130 (upper left) shown leading to a decision or query block 132. The query posed by the query block 132 relates to whether or not there is an "incoming" call. In that regard, in the sequence dial-up operation of the system, the logic preserves a readiness for receiving incoming calls. Should there be such a call, prompting a "yes" path from the block 132, the process will proceed to a block 134 and pursue a path to accommodate the incoming call. Specifically, from the block 134, if no monitor is available, a monitor displaying a "green" display would in interrupted. As indicated by a block 136, the "ANI" data from the incoming call would be employed to fetch the calling station identification and as indicated by the block 138, the DNIS data is similarly fetched. With the identification and status data in hand, the operation proceeds as represented by block 140 to display the composite scene and graphic data as depicted in FIG. 4.

The operation of input of the block 140 introduces a query as posed by a block 142 regarding the nature of the call, i.e., "incoming" or "outgoing". If the call was outgoing, as indicated by the block 142, it is automatically terminated after 30 seconds. Alternatively, if the call is "incoming", the operation is yielded to manual control as indicated by the block 146.

Returning now to the block 132 (FIG. 4, upper left), the circumstance of "no" "incoming" call advances the program to a query block 150 directed to the state of the current waiting list of lines with established contact with a remote location. If the waiting list is full, or has attained a predetermined limit, a "yes" is prompted. The operation then returns to the entry point of the line 130 to cycle the query posed by the block 132.

Following the alternative "no" path from the block 150 indicating the waiting list is not full advances the program to a block 152. The resulting operation is to fetch the next "out" call telephone number and the related data for the graphics display. As indicated above, in one embodiment, the data is simply addressed in the memory 48 (FIG. 6) by a four-digit number uniquely designating each remote location.

With the available telephone number, the auto dialer 46 is actuated as indicated by the block 154 (FIG. 7) during the interval while the graphics data is prepared for display.

Exiting from the block 154, three parallel, somewhat simultaneous queries, are presented by blocks 156, 158 and 160.

A "yes" response to any of the three queries prompts a fresh course of action as now will be considered.

The query block 156 poses the query of an "incoming" call. If such a call occurs, the operation is terminated in favor of receiving that call. Thus, the system reverts to block 134.

The query block 158 poses the query of time, i.e., "Have twenty seconds passed on the clock?" (not shown) in the control computer 44 (FIG. 6). If that interval does pass prior to the time when the called telephone is "answered" (goes "off-hook"), some difficulty is presumed. Under such a circumstance, the system makes additional attempts to attain a connection. If unsuccessful, other action is signalled, as by manual intervention.

Pursuing the course from the block 158 of FIG. 7, the calling connection is terminated (block 157), a counter is advanced (block 159) and unless the counter is at capacity (query block 161) with some delay, the call is again placed. After a predetermined number of efforts, e.g., three cycles, the counter is filled to prompt an "operator alert" (block 163). As a result, with manual intervention, other action is suggested. For example, alternate telephone numbers may be tried by manual intervention.

Next, assume that the outgoing call is answered as indicated by the block 160. The operation proceeds to the block 140 to accomplish the operations attendant providing the display. In that regard, the operation of the block 140 was considered above in relation to "incoming" calls. However, in the instant situation, involving an "outgoing" call, the operation proceeds to the block 144 simply to terminate the connection and the attendant display after 30 seconds. As indicated above, the display is given to an available one of the monitor stations V1–Vn from the waiting list somewhat as collectively represented by the block 140.

Thus, the system accomplishes a sequence of displays representative of the remote locations L1–Ln. As indicated above, a single monitor station may be employed; however, in the disclosed embodiment, several monitor stations V1–Vn share the sequence accommodating interruption either for manually controlled "outgoing" calls or "incoming" calls.

Recapitulating, the above description has treated automatically-actuated incoming calls, manually-actuated incoming calls, automatically-sequenced outgoing calls and manually-actuated outgoing calls, all with respect to a central unit CU. Details of the central unit CU have been treated and now a detailed exemplary structure for a remote location will be considered. Accordingly, reference will now be made to FIG. 8.

Figure 8:
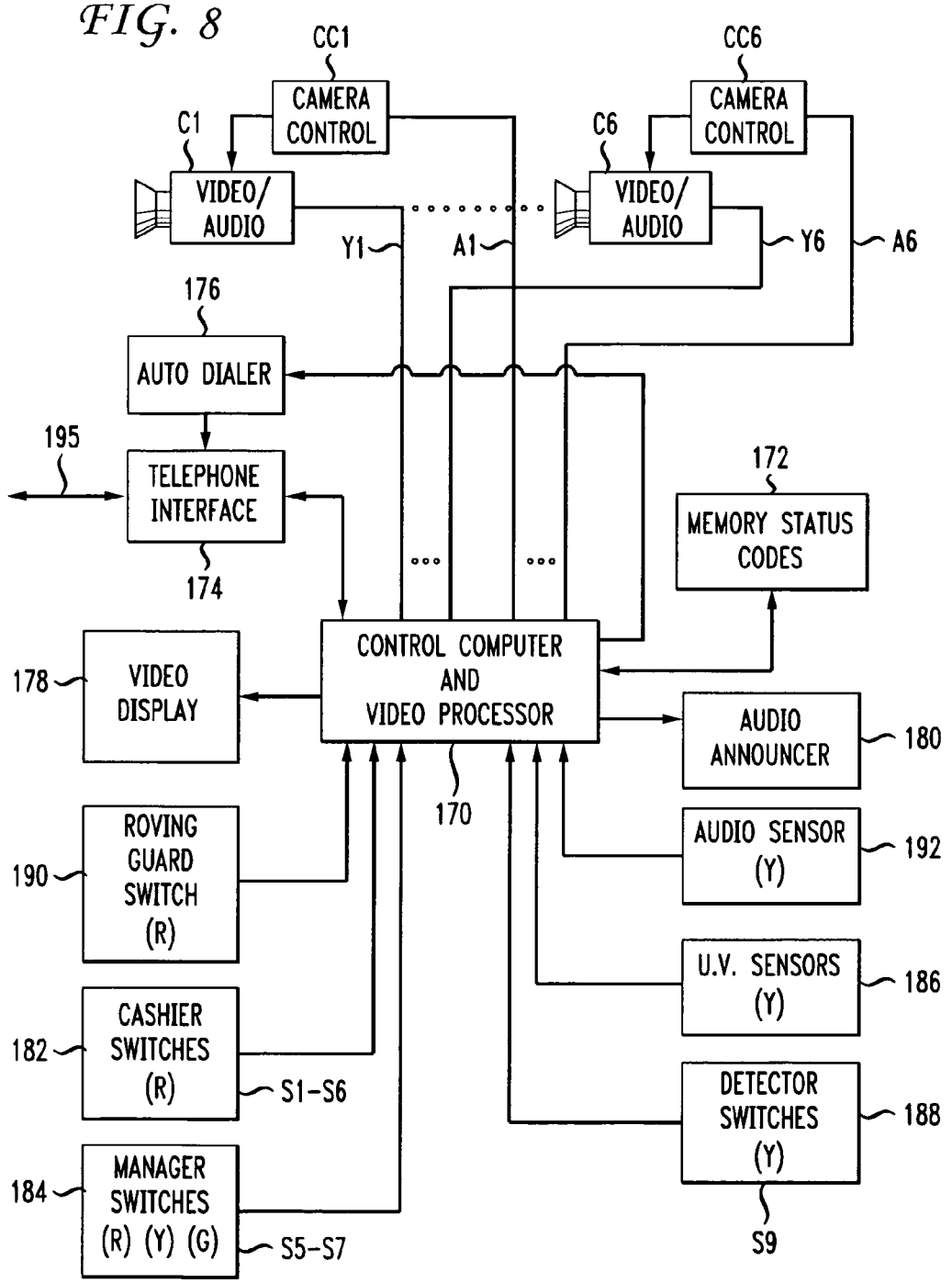
FIG. 8 is a detailed block diagram of a portion of the disclosed system in accordance with the present invention at a remote location.

The videophone cameras C1–C6 are indicated at the top of FIG. 8 connected to a control computer and videophone processor 170 which may involve a relatively simple control to coordinate switches and sensors with respect to a memory 172 (right center), a telephone switch or interface 174 (left center) and an auto dialer 176 (left upper). Apart from the control function, the processor 170 incorporates the elements for videophone processing, e.g., a video-CODEC chip set as mentioned above. As indicated, such structures are readily available for videophone operation. In conjunction with such structure, the computer 170 drives a video display 178 (left) and an audio speaker or announcer 180 (right).

The control and processor 170 is additionally connected to a series of sensors and switches as indicated above. Correlating the structure to FIG. 2, the switches S1–S1 are represented by a single block designated 182 (lower left). The manager switches S5–S7 are represented by a block 184. The infrared sensor or switch S8 is represented by a block 186 (right) and the doorway detector or switch S9 is represented by a block 188. Additionally, a roving guard switch is represented by a block 190 and an audio sensor or threshold microphone is designated by a block 192. The situation status prompted by the switches can be seen in FIG. 8, i.e., RGY ("red", "green" and "yellow" conditions).

Generally, with regard to control, the processor 170 has a dual function of responding to "incoming" calls and responding to local switches to place "outgoing" calls. Note that with respect to the processor 170, the designations "incoming" and "outgoing" calls are reversed from the terminology as used above with respect to the central unit CU.

Upon the occurrence of an incoming call from the telephone system TS through a cable 195, the telephone interface unit 174 establishes a connection through the processor 170 to the video display 178 and prompts the processor 170 to respond to processor control signals. More specifically, an incoming call prompts the control processor 170 to fetch a set of standard conditions from a look-up table embodied in the memory 172 to thereby establish settings for the videophone cameras C1–C6 and activate the video display 178 and the audio announcer 180. One of the cameras, typically camera C1, also will be selected. Accordingly, in response to the received call, the processor 170 provides an output from the camera C1 (set with a wide field of vision) through the telephone interface 174 to be carried as a videophone signal embodying both video and audio data. Additionally, the video display 178 and the audio announcer 180 are activated for response to any received audio or video data.

As indicated above, various signals may be communicated from the central unit CU through the telephone interface 174 to the control processor 170 for varying the settings of the cameras C1–C6. Thus, both control and videophone signals are communicated between the cameras C1–C6 and the processor 170. The videophone signals are provided through a series of lines Y1–Y6. The control signals pass in the other direction through lines A1–A6 and camera control units CC1–CC6, respectively. Essentially, the control units CC1 and CC6 activate the cameras C1–C6 for panning and field-of-vision changes. In that regard, the processor 170 simply decodes data signals originated at the central unit CU to actuate the control units CC1–CC6. Thus, once communication is established, the location apparatus of FIG. 8 simply responds to commands and any audio or video supplied. To initiate a communication the apparatus operates in a manner similar to the central unit CU.

With respect to outgoing calls, the processor 170 responds to various of the sensors or switches as embodied in the blocks 182, 184, 186, 188, 190 and 192. The sensor or switch of each of the blocks is associated with a look-up table embodied in the memory 172 storing a telephone number for designating the status and a calling line for designating the location. That is, as explained in detail above, generally DNIS signals are interpreted at the central unit to indicate a particular status while ANI signals are employed to indicate the location of the calling facility. An exemplary sequence will illustrate the operation.

Assume for example that a person enters the bank facility at location L1 (FIG. 2) carrying a weapon. Further assume that the door sensor 59 embodied in the detector 188 (FIG. 8) senses the presence of a sizeable metallic object and provides a signal to the control processor 170. Based on the source of the signal, the control computer addresses the memory 172 to fetch the telephone number for the central unit CU established to indicate a "caution" or "yellow" situation. That telephone number is retrieved. Accordingly, the telephone interface 174 goes "off-hook" and the auto dialer 176 is actuated to dial the fetched telephone number. Consequently, the telephone interface 174 is coupled for communication through the cable 195 and the dial-up telephone facility with the central unit CU. The ANI and DNIS signals provided, the camera C1 then provides audiovisual data for a videophone signal supplied from the control processor 170 and the telephone interface 174 to the active line. Accordingly, the desired display is accomplished as explained above, also affording various selected control operations from the central unit CU, as indicated above.

To consider an exemplary control operation, assume for example that the operator at the central unit CU perceives a particular problem at the teller window T1 (FIG. 2). As a consequence, an operation command would be entered as described above switching the source of the videophone signal from the camera C1 to the camera C3. Also, command operating signals could be provided to pan or vary the field of vision provided by the camera. Thus, a desired display of the area of interest would follow.

As will be apparent from the above, systems of the present invention may be variously implemented to accommodate a multitude of different facilities and needs. Also, the system may be configured to accommodate specialists at the videophone terminals V1–Vn (FIGS. 1, 3 or 6). For example, certain of the terminals V1–Vn might be attended by specialists in identified emergencies, e.g., situation "red" or "emergency" calls. Other terminals might be attended by specialists in "alert" or "yellow" situations, e.g., a suspicious man standing in a doorway, etc. Pursuing the considerations, still other of the terminals V1–Vn could be monitored by specialists in the standard or routine monitoring, e.g., ten or twenty seconds per location.

To accommodate the dedication of certain terminals V1–Vn to specialists, the switch 102 (FIG. 6) is controlled by the control computer to transfer connected remote locations L1–Ln from one of the terminals V1–Vn to another. In some instances, it also may be desirable to couple a location to several of the terminals.

Figure 9:
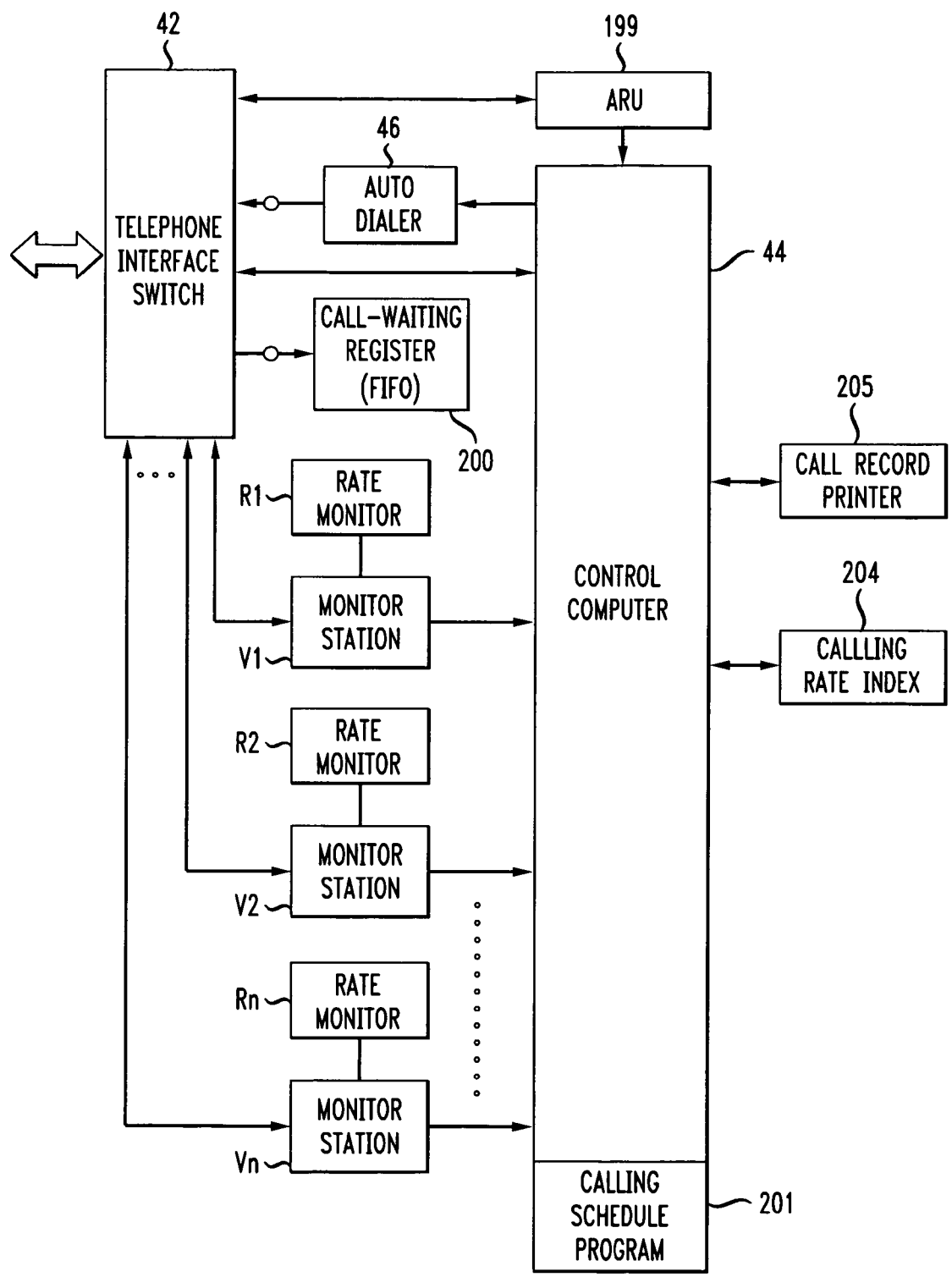
FIG. 9 is a somewhat detailed block diagram of the central station portion of the disclosed system in accordance with an alternative embodiment of the present invention.

Referring now to FIG. 9, in accordance with another exemplary embodiment, multiple operators at multiple monitor stations V1–Vn are illustrated. As explained above, multiple central units CU may be employed to monitor widely distributed locations with capabilities of routing calls to each other. At each of the central units CU, incoming calls are sequenced to each of the operators at the each of the monitor stations depending on the cumulative handling capability of each operator. For example, if a particular operator is handling calls at the average rate of six seconds each, calls to that operator will be sequenced at that rate. As described above, inbound calls are received through the telephonic interconnection 102 (FIG. 6, upper left) accommodated by the interface telephone switch 42 as well known in the art.

Incoming calls are queued by the call-waiting register 200, for example a FIFO, and handed to the next available operator in sequence. Considering the placement of outgoing calls (under manual or automatic control) to provide a sequential display from remote locations L1–Ln, autodialers 46 establish communication with each of the locations L1–Ln in sequence and forward the calls to the next available operator.

For most operating systems, it is likely that during much of the time, the monitor stations will collectively be programmed to automatically provide a sequential display of the remote location L1–Ln. During the sequential operation, the control computer 44 or the calling schedule program of the control computer 201 fetches telephone numbers for remote locations L1–Ln from memory (FIG. 6) in sequence, actuates the auto dialer 46 accordingly, and assigns the resulting connections to one of the monitor stations V1–Vn. Note that an ARU (audio response unit) 199 is coupled between the switch 42 and the control computer 44 as to supplement the operation using the established capabilities of such units.

After short intervals of operation, e.g. 30 seconds or 10 seconds, the control computer 44 terminates the display connection to the station V1–Vn in favor of another waiting connection at the call-waiting register 200. The intervals of operation may vary depending upon the rate at which the operator views the displays. The operator may manually request the next display by operating the control button 99 (FIG. 5, top center).

Alternatively, rate monitors R1–Rn connected to each of the monitor stations V1–Vn respectively monitor the cumulative handling capability of each operator, for example, count the number of calls handled by each operator in a given period of time. Based upon the count provided by the rate monitors R1–Rn, the control computer 44 assigns a calling rate index number for each operator. The number controls the volume of calls queued for each operator. For example, CHART 4, sets forth exemplary calling rate index as for various numbers of calls per minute. In the event an operator is capable of handling 30 calls, his or her calling rate index in accordance with the exemplary chart would be 3 and so on. The calling rate index is indicated by a storage 204 (FIG. 9, right).

CHART 4

| Calls Per Minute | Calling Rate Index |
| --- | --- |
| 30 | 3 |
| 35 | 4 |
| 40 | 5 |
| 45 | 6 |
| 50 | 7 |
| 55 | 8 |
| and so on | and so on |

As a further consideration, if the cumulative handling capabilities of the operators decrease or increase, the rate monitor R1–Rn would report such a change to the computer control 44 thereby altering the number of calls contemplated for the operators. In that regard, the operators may control the speed control button 101 to vary the number of calls. Records of call schedules and performance are provided by a printer 205.

Furthermore, selective distribution of calls may be appropriate, for example, as explained, calls reporting "emergency" situations may be forwarded to a particular operator trained in emergency procedures. Alternatively, calls may be routed to the next available operator. In addition, as the calls are queued in sequence, calls reporting "emergency" or "alert" situations may precede other routing calls in accordance with an override feature. In keeping with this feature an "emergency" situation may automatically override an "alert" situation.

Figure 10:
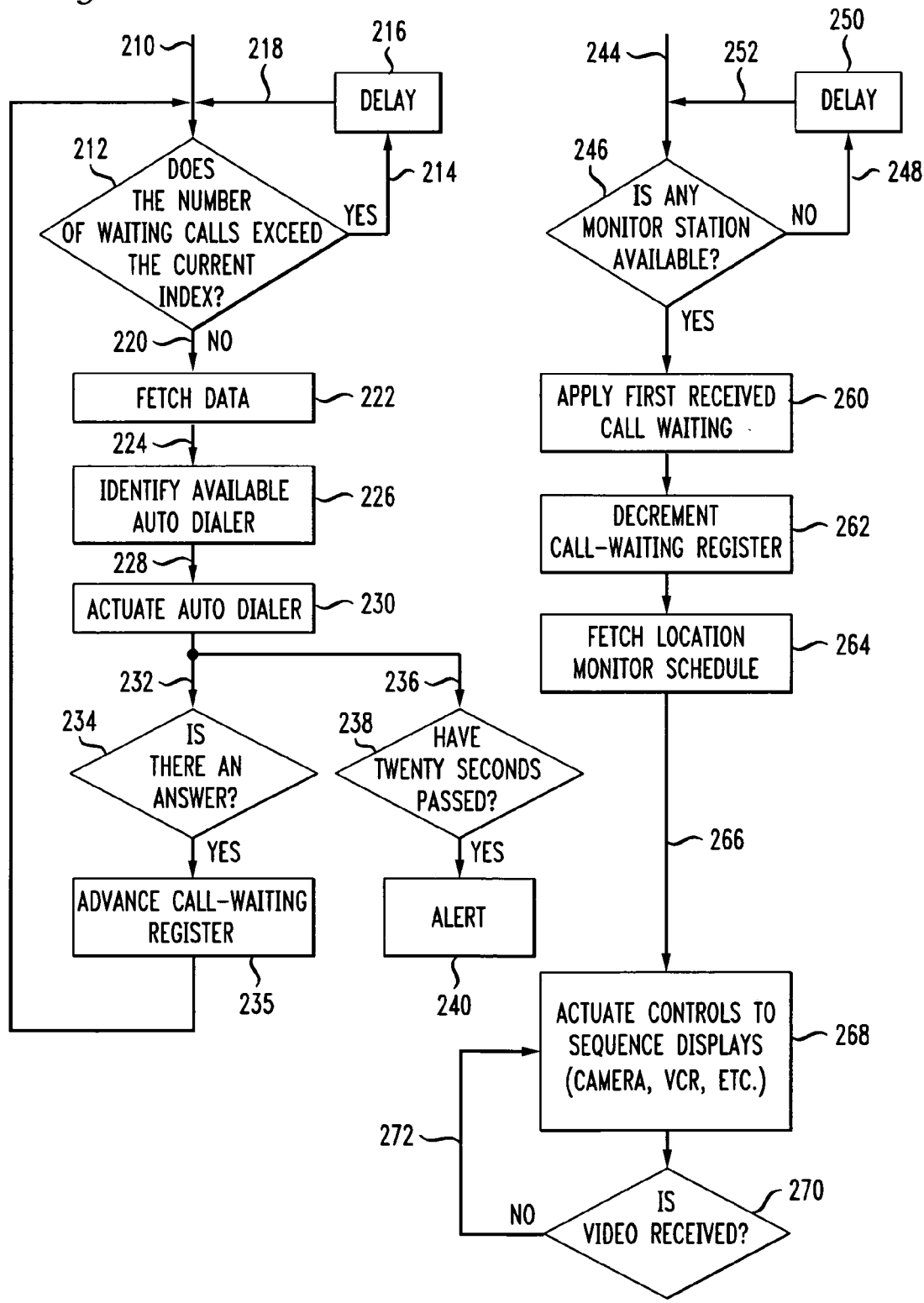
FIG. 10 is a logic diagram illustrating the operation program of the system of FIG. 9.

A logic program further indicating the control operations of the control computer 44 according to an exemplary format will now be treated with reference to FIG. 10. The process is entered at a line 210 (top center) shown leading to a decision or query block 212. The query posed by the query block 212 relates to whether the number of waiting calls exceed the current index. In the sequence dial-up system, the logic preserves a readiness for receiving incoming calls. Should the number of waiting of calls exceed a predetermined current index, prompting a "yes", the path 214 from the block 212 proceeds to a block 216 for a delay. The delay may be predetermined, after which the process returns along path 218 to the query block 212 again posing the same question.

If it is determined that the number of waiting calls does not exceed the current index, the process proceeds along path 220 to a block 222. As indicated by block 222, data on the next location L1–Ln is fetched. At this point the program advances along line 224 to block 226, whereby an available auto dialer 46 is determined. Line 228 leads to block 230 directed to actuating the auto dialer 46 to establish connection with one of the locations L1–Ln. One output path 232 from block 228 leads to a query block 234 and introduces a query as to whether there is an answer from the location L1–Ln. If an answer from the location L1–Ln is received, the call-waiting register 200 is advanced by block 235.

Another output path 236 from block 228 leads to another query block 238 to determine if twenty seconds have passed. Following a predetermined time period, if the autodialer 46 is unable to establish connection an "alert" situation is reported, as indicated by a block 240.

Pursuing an alternative logic process relating to incoming calls, a line 244 (upper right) leads to a query block 246 to determine if a monitor station V1–Vn is available. If all the monitor stations V1–Vn are occupied, a line 248 from the query block delays the process at block 250 and following a return line 252 again poses the query at block 246.

Assuming that a monitor station V1–Vn is available, as indicated by block 260, the foremost (oldest) or first received call waiting is forwarded to the monitor station V1–Vn. The call-waiting register 200 notes a decrement at block 262 and subsequently fetches a location monitor schedule from memory at the central unit CU indicated by block 264.

As explained above, the location monitor schedule may specify a sequence of view displays for each location, as in the event multiple cameras are involved. Using a previous example of FIG. 2, the location monitor schedule may define an initial panoramic view, followed by the view from a first camera for twenty seconds, followed by a view from a second camera for ten seconds, then zooming onto a vault that would appear in the view from a third camera for ten seconds.

In relation to scheduled formats, as explained, the operation of block 264 is to implement monitor schedules if specified. From the block 264, a line 266 advances the process to block 268, at which stage the operator can actuate the status controls to sequence displays, for example, in accordance with the location monitor schedule. At query block 270, a query is posed as to whether a video signal is received from the location L1–Ln. In the event no video is received, for example, if the camera lens has been deliberately covered or broken, operation returns to block 268 along line 272, enabling the operator to actuate controls, for example, to display a view from the next camera to better assess the situation in case of an emergency, etc. Alternatively, such operation may be automatic. After viewing of the location L1–Ln has been performed, the above process is repeated with the next incoming call.

Figure 11:
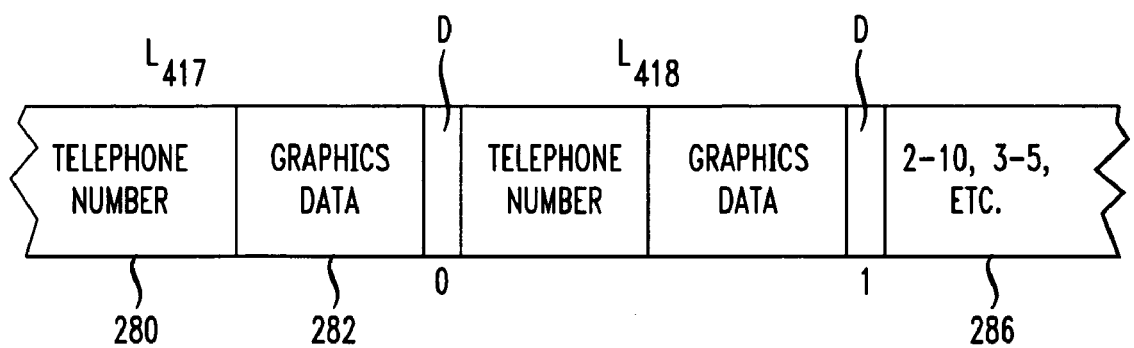
FIG. 11 is a fragmentary diagrammatic representation of a storage cell as may be formatted in the system of the present invention.

FIG. 11 illustrates an exemplary storage cell of the central unit CU wherein the telephone number, graphic data and additionally, location monitor schedules may be stored. For example, the telephone number for location designated L417 is indicated at field 280, and other pertinent graphics data is indicated at a field 282. A binary number field D indicates the display format. A "0" specifies that only a panoramic view is desired, for example as for a convenience store. A binary number "1", on the other hand denotes a more sophisticated location monitor schedule. Additionally, the location monitor schedule is stored, as indicated at field 286, outlining the exact sequence to be followed. It should be recognized that location monitor schedules may be revised and updated on site at central units CU as well as from remote locations. For example, considering a large bank with 1000 branch offices where each branch office is routinely monitored by five installed cameras for a twenty second time interval every hour on a daily basis, changes, cancellations or updates to monitor schedules between branches may be requested remotely.

In accordance with a format for conducting market research, a single monitor V1 may be used to monitor the desired location, for example a bank for determining customers' reaction to new interest rates. As an example, zoom in capabilities of the camera C2 may be utilized to view and listen to a bank teller's interaction with a customer. At the central unit CU, a recording of the interaction or the researcher's observations may be obtained by entering data via the keyboard and storing the data in memory. The researcher may request subsequent locations via the push button 99. By depressing the push button, the auto dialer 46 automatically dials the next location. The auto dialer 46 may have all the respective telephone numbers of all the locations stored in memory. Alternately, calls may be queued for automatic switching of locations after predetermined time periods controlled by a clock, for example five minutes.

In a simple monitoring or "video escort" format to ensure proper execution, deposit, withdrawal and the like, of funds at banks or supermarkets may involve monitoring at select times of the day for predetermined time periods. For example, supermarkets at remote locations may be called up and daily closing procedures involving securing of monetary funds, etc. may be observed (e.g. 9:55–10:00 p.m., every evening). In a related format, inspections of restaurant facilities and like may be conducted from one of the central units CU.

In a related context, a branch manager may contact the central units CU from an external telephone (regular or cellular) and request a video escort prior to entering the branch facility. Accordingly, the branch managers are monitored by the central unit CU1–N as they conduct their business, for example, handle large funds etc. Signals (ANI or DNIS) identifying telephone numbers may be employed to implement a desired display at the central units CU1–N.

In view of the above description, it will be apparent that numerous operating formats, programs and layouts may be accomplished using a wide variety of videophone equipment in cooperation with computing and sensor apparatus. As indicated above, the disclosed embodiment affords one arrangement; however, the scope hereof should not so confined, rather the scope hereof should be in accordance with the claims as set forth below.

What is claimed is:

1. A system for communicating with a plurality of remote locations from a central station utilizing dial-up telephone facilities comprising:
   television communication structures located at said plurality of remote locations for telephonically providing representative image television signals of said plurality of remote locations and for telephonically receiving and sending audio signals to carry voice;
   a plurality of television display structures, including speaker phones, located at said central station for receiving telephonic signals and displaying said representative image television signals of said plurality of remote locations;
   telephonic interface apparatus for interconnecting said television communication structures at said plurality of said remote locations with said plurality of television display structures at said central station and including at least one audio response unit at said central station; and
   a control unit for controlling said telephonic interface apparatus to establish television and audio communication between a select television camera structure at one of said plurality of remote locations and one of said plurality of television display structures at said central station, with said central station receiving a remote location display and one of said plurality of remote locations receiving prompts from said at least one audio response unit for manually actuating a keypad to provide DTMF signals.

2. A system according to claim 1 further including means for controlling said plurality of television display structures in accordance with said DTMF signals.

3. A system according to claim 1 wherein said control unit includes television communication structure for establishing television communication in response to DTMF signals representing a personal identification number.

4. A system according to claim 1 wherein said telephonic interface apparatus includes means for providing "D" channel type signals and wherein said control unit establishes communication to a select one of said television display structures in accordance with said "D" channel type signals.

5. A system for communicating with a plurality of remote locations from at least one central station utilizing dial-up telephone facilities, comprising:
   television camera structures positioned at said plurality of remote locations, each of said television camera structures for providing scene representative television signals and including a speaker phone and a keypad;
   at least one television display structure including at least one speaker phone at said at least one central station for receiving telephonic signals and displaying said scene representative television signals;
   telephone interface unit for selectively interconnecting said television camera structures and said at least one television display structure and including at least one audio response unit at said at least one central station; and
   a control unit at said at least one central station including a computer for automatically controlling said telephone interface unit to provide voice prompts by said audio response unit for manual activation of a keypad to provide DTMF signals.

6. A system according to claim 5 wherein said control unit controls said television display structure in accordance with said DTMF signals.

7. A system according to claim 6 wherein said control unit provides graphic signals to supplement said scene representative television signals in response to said DTMF signals.

8. A system according to claim 5 further including a printer coupled to said control unit.

9. A system for monitoring a plurality of scrutiny locations from a central station using dial-up telephone facilities comprising:
   television camera structures located at said plurality of scrutiny locations for providing representative dynamic image television signals representative of scenes from said plurality of scrutiny locations;
   at least one television display structure located at said central station;
   telephonic interface apparatus for interconnecting said television camera structures at said plurality of scrutiny locations to said at least one television display structure at said central location; and
   a control unit located at said central station including a computer and a memory for storing identification designation data and graphic display data for said plurality of scrutiny locations, said control unit programmed to sequentially and automatically actuate, under control of said computer, said telephonic interface apparatus to establish television communication between said central station and said plurality of scrutiny locations to provide a sequence of remote location displays at said central station, for programmed intervals, showing a scene and graphic display data of the plurality of scrutiny locations, said control unit further including interrupt structure for receiving an interrupt signal manifesting a predetermined circumstance to interrupt said sequence of remote location displays controlled by the computer and to provide an alternate display of a scene from another of said plurality of scrutiny locations along with graphic display data.

10. A system according to claim 9 further including sensor units at said plurality of scrutiny locations for providing said interrupt signal to said control unit.

11. A system according to claim 9 wherein said control unit includes means for providing graphic displays on said remote location displays.

12. A system according to claim 9 further including operator control structure at said central station to provide said interrupt signal.

13. A system according to claim 9 wherein said television camera structures for at least one of said plurality of scrutiny locations includes a processor for interfacing said control unit at said central station to control said television communication between said central station and said one of said plurality of scrutiny locations.

14. A system according to claim 13 wherein a television camera structure for said one of said plurality of scrutiny locations includes a plurality of sensor units located at said one of said plurality of scrutiny locations for providing interrupt signals to said control unit.

15. A system for communicating with a plurality of remote locations from a central station utilizing dial-up telephone facilities comprising:
- television communication structures at said plurality of remote locations for telephonically providing representative dynamic image television signals and for telephonically receiving and sending audio signals to carry voice;
- a plurality of television display structures at said central station for providing a display from said representative image television signals and for providing and manifesting audio signals;
- telephonic interface apparatus for interconnecting said television communication structures at said plurality of remote locations and said central station to provide two-way audio and at least one-way video communications;
- a memory unit for storing identification designation data, time sequence data and remote location data on said plurality of remote locations; and
- a control computer coupled to said memory unit and said telephonic interface apparatus and programmed to sequentially and automatically actuate, said telephonic interface apparatus, under control of said computer in accordance with said identification designation data and said time sequence data to selectively communicate from said plurality of remote locations to one of said plurality of television display structures.

16. A system according to claim 15 wherein said remote location data includes identification data relating to said plurality of remote locations.

17. A system according to claim 15 wherein said control computer couples a specific one of said television display structures for interconnection to a select television display structure under control of "D" channel type signals provided by said telephonic interface apparatus.

18. A system according to claim 15 further including a billing data memory section for storing billing time as related to monitored remote locations.

19. A system according to claim 15 wherein said telephone interface provides "D" channel type signals and said control computer addresses said memory units in accordance with said "D" channel type signals.

20. A system according to claim 15 wherein the computer controlled selection of sites is sequential.

21. A system according to claim 15 wherein the computer controlled selection of sites is random.

22. A system according to claim 15 wherein the computer controlled selection of sites is predetermined.

23. A system according to claim 15 wherein the computer controlled system accommodates intervals of display.

24. A system according to claim 23 wherein the intervals of display include variable observation times.

25. A system according to claim 15 wherein at least certain of the remote location include video phones.

26. A system according to claim 15 wherein at least certain of the remote location include speaker phones.

27. A system according to claim 15 wherein at least certain of the remote location include regular telephones.

28. A system according to claim 27 wherein the regular telephones support two-way communication.

29. The system according to claim 27 wherein the telephones support communication from the central unit to the remote locations.

30. A system according to claim 15 wherein at least certain of the remote locations include sensors.

31. The system according to claim 30 wherein the sensors include motion detectors.

32. The system according to claim 31 wherein the motion detectors provide an indication of the need for scrutiny at a location.

33. A system according to claim 15 wherein at least certain of the remote locations include autodialers.

34. A system according to claim 15 wherein at least certain of the remote locations include computer memory.

35. A system according to claim 15 wherein the graphic display data includes floor plan data.

36. A system according to claim 15 further including memory for storing scrutiny location graphic display data.

37. A system according to claim 36 wherein the graphic display data includes street data.

38. A system according to claim 36 wherein the graphic display data includes telephone number information.

39. The system according to claim 15 including a plurality of control units, the control units including capability to route calls to each other.

40. The system according to claim 15 wherein the control unit permits camera selection at the scrutiny locations.

41. The system according to claim 15 further including a clock operatively connected to said control unit.

42. The system according to claim 41 wherein the clock coupled to said control unit defines selected intervals of time for observation of the scrutiny locations.

43. The system according to claim 15 further including a detector for detecting an inoperative camera.

44. The system according to claim 43 wherein the detector detects that the lens of the camera is covered.

45. A system for communicating with a plurality of remote locations from a central station utilizing dial-up telephone facilities comprising:
- television communication structures at said plurality of remote locations for telephonically providing representative image television signals and for telephonically receiving and sending audio signals to carry voice;
- a plurality of television display structures at said central station for providing a display from said representative image television signals for providing and manifesting audio signals;
- telephonic interface apparatus for interconnecting said television communication structures at said plurality of remote locations and said central station to Provide two-way audio and at least one-way video communications:
- a memory unit for storing time sequence data and remote location data on said remote locations;

a voice generator and wherein said memory unit stores an audio dictionary for driving said voice generator to provide said audio signals: and a control computer coupled to said memory unit and said telephonic interface apparatus for actuating said telephonic interface apparatus to selectively communicate from said plurality of remote location to one of said plurality of television display structures in accordance with said time sequence data and to control the display of said television display structures.

46. A system for communicating with a plurality of remote locations from a central station utilizing dial-up telephone facilities comprising:

television communication structures at said plurality of remote locations for telephonically providing representative dynamic image television signals and for telephonically providing audio signals to carry voice;

a plurality of television display structures at said central station for providing a display from said representative image television signals;

telephonic interface apparatus for interconnecting said television communication structures at said plurality of remote locations and said central station to provide at least one-way audio and at least one-way video communications;

a memory unit for storing programmed operations for sequential remote location communication including identification designation data relating to the plurality of remote locations; and a control computer coupled to said memory unit and said telephonic interface apparatus for sequentially actuating in accordance with said programmed operations said telephonic interface apparatus to selectively communicate in sequence from said plurality of remote locations to at least one of said plurality of television display structures to control the display of said television display structures.

47. The system of claim 46 wherein the sequential remote location communication is predetermined.

48. The system of claim 46 wherein the sequential remote location communication is random.

49. The system of claim 46 wherein the programmed operation includes programmed intervals of display.

50. The system of claim 46 wherein the programmed operation includes variable observation time.

51. The system of claim 46 wherein the audio communications includes audio from the central station to the remote location.

52. The system of claim 46 wherein the audio communication includes two-way audio between the central station and the remote locations.

53. The system claim 46 wherein at least certain of the television communication structure may be controlled for pan by the central station.

54. The system of claim 46 wherein at least certain of the television communication structure may be controlled for pan by the central station.

55. The system of claim 46 wherein at least certain of the television communication structure may be controlled for tilt by the central station.

56. The system of claim 46 wherein the display structures may display freeze frames.

57. The system of claim 46 wherein the display structures may display high resolution images.

58. The system of claim 46 wherein the system further includes image enhancement capability.

59. The system of claim 46 wherein the system includes D-channel or in-band signaling apparatus.

60. The system of claim 59 wherein the D-channel or in-band signaling apparatus includes ANI.

61. The system of claim 59 wherein the D-channel or in-band signaling apparatus includes DNIS.

62. The system of claim 46 further including a memory for storing graphical display on at least certain of the remote locations.

63. The system of claim 62 wherein the graphical display data includes a floor plan of the remote location.

64. The system of claim 62 wherein the graphical display data includes a telephone number.

65. The system of claim 64 wherein the graphical display data includes a telephone number wherein the telephone number is associated with the remote locations.

66. The system of claim 64 wherein the graphical display data includes a telephone number wherein the telephone number is associated with security personnel associated with the remote location.

67. The system of claim 46 further including interrupt structure coupled to the control computer for receiving an interrupt signal.

68. The system of claim 67 wherein the interrupt signal is initiated at the remote location.

69. The system of claim 67 wherein the interrupt signal is initiated at the central station.

70. The system of claim 67 wherein the response to the interrupt signal is automatic.

71. The system of claim 67 wherein the response to the interrupt signal is manually required.

72. A system for enabling video communications with a plurality of remote locations from a central station utilizing dial-up telephone facilities comprising:

video communication structures at said plurality of remote locations for telephonically providing representative dynamic video images;

a plurality of video display structures at said central station for providing a display from said representative image video signals;

telephonic interface apparatus for interconnecting said video communication structures at said plurality of remote locations and said central station to provide at least one-way video communications;

a memory unit for storing programmed operations for sequential remote location communication; and a control computer coupled to said memory unit and said telephonic interface apparatus for actuating said telephonic interface apparatus to selectively communicate in sequence, from said plurality of remote locations to at least one of said plurality of video display structures in accordance with said programmed operation to control the display of said video display structures.

73. The system of claim 72 wherein the sequential remote location communication is predetermined.

74. The system of claim 72 wherein the sequential remote location communication is random.

75. The system of claim 72 wherein the programmed operation includes programmed intervals of display.

76. The system of claim 72 wherein the programmed operation includes variable observation time.

77. The system of claim 72 wherein said telephonic interface apparatus includes at least one way audio.

78. The system of claim 77 wherein the audio communications includes audio from the central station to the remote location.

79. The system of claim 77 wherein the audio communication includes two-way audio between the central station and the remote locations.

80. The system of claim 72 wherein the system includes D-channel or in-band signaling apparatus.

81. The system of claim 80 wherein the D-channel or in-band signaling apparatus includes ANI.

82. The system of claim 80 wherein the D-channel or in-band signaling apparatus includes DNIS.

83. The system of claim 72 further including a memory for storing graphical display on at least certain of the remote locations.

84. The system of claim 72 further including interrupt structure coupled to the control computer for receiving an interrupt signal.

* * * * *

Disclaimer

7,019,770 B1 — Ronald A. Katz, Los Angeles, CA (US). VIDEOPHONE SYSTEM FOR SCRUTINY MONITORING WITH COMPUTER CONTROL. Patent dated March 28, 2006. Disclaimer filed January 28, 2016, by the assignee, Telebuyer, LLC.

Hereby disclaim complete claims 1-84 of said patent.

*(Official Gazette, April 5, 2016)*